US009393695B2

(12) United States Patent
Scott et al.

(10) Patent No.: US 9,393,695 B2
(45) Date of Patent: Jul. 19, 2016

(54) RECOGNITION-BASED INDUSTRIAL AUTOMATION CONTROL WITH PERSON AND OBJECT DISCRIMINATION

(71) Applicant: ROCKWELL AUTOMATION TECHNOLOGIES, INC., Mayfield Heights, OH (US)

(72) Inventors: Steven J. Scott, Oconomowoc, WI (US); Thong T. Nguyen, Milwaukee, WI (US); David D. Brandt, New Berlin, WI (US); Tony Gibart, New Berlin, WI (US); Gary D. Dotson, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 211 days.

(21) Appl. No.: 13/779,569

(22) Filed: Feb. 27, 2013

(65) Prior Publication Data

US 2014/0244037 A1      Aug. 28, 2014

(51) Int. Cl.
| | |
|---|---|
| *G08B 21/00* | (2006.01) |
| *B25J 9/16* | (2006.01) |
| *G06K 9/62* | (2006.01) |
| *G06K 9/22* | (2006.01) |
| *G05B 15/02* | (2006.01) |

(52) U.S. Cl.
CPC ............... *B25J 9/1694* (2013.01); *G05B 15/02* (2013.01); *G06K 9/228* (2013.01); *G06K 9/6293* (2013.01); *G05B 2219/2614* (2013.01); *G05B 2219/2642* (2013.01)

(58) Field of Classification Search
CPC ...... B60R 1/12; G08B 3/10; G08B 13/19602; G08B 13/19615; H04N 7/18; G01C 3/08; G01B 11/026; G06K 9/00979; G06K 9/00255; G06K 9/00577; G06K 9/228; G06K 9/6293; G06K 9/00771; G06F 3/017
USPC .................. 340/425.5, 540, 567, 5.83, 13.23, 340/539.13, 573.1; 345/427, 589; 382/103, 382/195, 154, 100, 115, 228, 107; 348/222.1, 46, 155, 143, 86; 356/4.01, 356/614
See application file for complete search history.

(56) References Cited

U.S. PATENT DOCUMENTS

| | | | |
|---|---|---|---|
| 5,812,978 | A | 9/1998 | Nolan |
| 5,884,072 | A | 3/1999 | Rasmussen |
| 6,226,388 | B1 | 5/2001 | Qian et al. |

(Continued)

FOREIGN PATENT DOCUMENTS

| | | |
|---|---|---|
| WO | WO-2009/155946 A1 | 12/2009 |
| WO | WO-2012/039280 A1 | 3/2012 |

OTHER PUBLICATIONS

Extended European Search Report for Application No. 14154938.6 mailed Nov. 10, 2014.

*Primary Examiner* — Hoi Lau
(74) *Attorney, Agent, or Firm* — Fletcher Yoder, P.C.

(57) ABSTRACT

The present disclosure generally relates to a method for performing industrial automation control in an industrial automation system may include detecting, via a sensor system, positions and/or motions of one or more humans and/or one or more objects in an industrial automation system and distinguishing, via a programmed computer system, between one or more humans and one or more objects based upon the detected positions and/or motions. The method may then include implementing a control and/or notification action based upon the distinction.

23 Claims, 13 Drawing Sheets

(56) References Cited

U.S. PATENT DOCUMENTS

| | | | |
|---|---|---|---|
| 6,275,146 B1* | 8/2001 | Kithil et al. | 340/425.5 |
| 6,421,453 B1 | 7/2002 | Kanevsky et al. | |
| 6,804,396 B2 | 10/2004 | Higaki et al. | |
| 6,912,429 B1* | 6/2005 | Bilger | 700/19 |
| 7,042,442 B1 | 5/2006 | Kanevsky et al. | |
| 7,174,033 B2 | 2/2007 | Yukhin et al. | |
| 7,224,830 B2 | 5/2007 | Nefian et al. | |
| 7,227,526 B2 | 6/2007 | Hildreth et al. | |
| 7,257,236 B2 | 8/2007 | Yukhin et al. | |
| 7,274,803 B1 | 9/2007 | Sharma et al. | |
| 7,308,112 B2 | 12/2007 | Fujimura et al. | |
| 7,321,854 B2 | 1/2008 | Sharma et al. | |
| 7,372,977 B2 | 5/2008 | Fujimura et al. | |
| 7,433,024 B2 | 10/2008 | Garcia et al. | |
| 7,502,498 B2 | 3/2009 | Wen et al. | |
| 7,536,034 B2 | 5/2009 | Rhoads et al. | |
| 7,539,532 B2 | 5/2009 | Tran | |
| 7,570,785 B2 | 8/2009 | Breed | |
| 7,590,262 B2 | 9/2009 | Fujimura et al. | |
| 7,598,942 B2 | 10/2009 | Underkoffler et al. | |
| 7,606,411 B2* | 10/2009 | Venetsky | G06K 9/00355 345/475 |
| 7,620,202 B2 | 11/2009 | Fujimura et al. | |
| 7,646,372 B2 | 1/2010 | Marks et al. | |
| 7,650,017 B2 | 1/2010 | Yamada | |
| 7,655,895 B2 | 2/2010 | Breed | |
| 7,663,689 B2 | 2/2010 | Marks | |
| 7,665,041 B2 | 2/2010 | Wilson et al. | |
| 7,684,018 B2 | 3/2010 | Albers et al. | |
| 7,710,391 B2 | 5/2010 | Bell et al. | |
| 7,725,547 B2 | 5/2010 | Albertson et al. | |
| 7,734,061 B2 | 6/2010 | Breed et al. | |
| 7,738,678 B2 | 6/2010 | Breed et al. | |
| 7,792,328 B2 | 9/2010 | Albertson et al. | |
| 7,801,332 B2 | 9/2010 | Albertson et al. | |
| 7,830,532 B2 | 11/2010 | De Coi | |
| 7,831,087 B2 | 11/2010 | Harville | |
| 7,831,358 B2 | 11/2010 | Breed et al. | |
| 7,834,846 B1 | 11/2010 | Bell | |
| 7,840,031 B2 | 11/2010 | Albertson et al. | |
| 7,848,850 B2 | 12/2010 | Hoshino et al. | |
| 7,850,526 B2 | 12/2010 | Zalewski et al. | |
| 7,864,072 B2 | 1/2011 | Basson et al. | |
| 7,874,917 B2 | 1/2011 | Marks et al. | |
| 7,877,706 B2 | 1/2011 | Albertson et al. | |
| 7,887,089 B2 | 2/2011 | Breed et al. | |
| 7,898,385 B2 | 3/2011 | Kocher | |
| 7,953,246 B1 | 5/2011 | Tu et al. | |
| 7,961,910 B2 | 6/2011 | Lee et al. | |
| 7,971,156 B2 | 6/2011 | Albertson et al. | |
| 7,983,817 B2 | 7/2011 | Breed | |
| 7,996,793 B2 | 8/2011 | Latta et al. | |
| 8,005,263 B2 | 8/2011 | Fujimura et al. | |
| 8,041,659 B2 | 10/2011 | Tu et al. | |
| 8,050,461 B2 | 11/2011 | Shpunt et al. | |
| 8,063,882 B2 | 11/2011 | Hinckley et al. | |
| 8,107,058 B2 | 1/2012 | Stein et al. | |
| 8,112,371 B1 | 2/2012 | Tu et al. | |
| 8,139,204 B2 | 3/2012 | Braune et al. | |
| 8,145,594 B2 | 3/2012 | Geisner et al. | |
| 8,146,020 B2 | 3/2012 | Clarkson | |
| 8,150,142 B2 | 4/2012 | Freedman et al. | |
| 8,152,198 B2 | 4/2012 | Breed et al. | |
| 8,156,067 B1 | 4/2012 | Tu et al. | |
| 8,166,421 B2 | 4/2012 | Magal et al. | |
| 8,195,585 B1 | 6/2012 | Tu et al. | |
| 8,315,735 B2 | 11/2012 | Nihei et al. | |
| 8,330,095 B2* | 12/2012 | Kawabata | 250/221 |
| 8,736,631 B2* | 5/2014 | Mukai et al. | 345/589 |
| 8,922,342 B1* | 12/2014 | Ashenfelter | G07C 9/00 340/5.52 |
| 2001/0044789 A1 | 11/2001 | Widrow et al. | |
| 2003/0025601 A1* | 2/2003 | Gruteser et al. | 340/540 |
| 2004/0107027 A1* | 6/2004 | Boudrieau | 701/1 |
| 2004/0113933 A1 | 6/2004 | Guler | |
| 2004/0193413 A1 | 9/2004 | Wilson et al. | |
| 2005/0040947 A1* | 2/2005 | Buckley et al. | 340/567 |
| 2005/0052148 A1 | 3/2005 | Carlson et al. | |
| 2005/0089198 A1* | 4/2005 | Ono | G06K 9/00255 382/115 |
| 2005/0184869 A1* | 8/2005 | Micko | G08B 13/19 340/567 |
| 2006/0291694 A1* | 12/2006 | Venetianer | G06K 9/00771 382/103 |
| 2007/0194944 A1 | 8/2007 | Galera et al. | |
| 2008/0065291 A1 | 3/2008 | Breed | |
| 2008/0068379 A1* | 3/2008 | Larsen et al. | 345/427 |
| 2008/0084300 A1 | 4/2008 | Albers et al. | |
| 2008/0170749 A1* | 7/2008 | Albertson | G06K 9/00979 382/103 |
| 2008/0172261 A1* | 7/2008 | Albertson et al. | 705/7 |
| 2008/0186488 A1* | 8/2008 | Kiesel et al. | 356/335 |
| 2008/0192261 A1 | 8/2008 | Schipke et al. | |
| 2008/0198008 A1* | 8/2008 | Gruteser et al. | 340/540 |
| 2008/0204227 A1* | 8/2008 | Gruteser et al. | 340/540 |
| 2008/0269949 A1 | 10/2008 | Norman et al. | |
| 2009/0146817 A1 | 6/2009 | Ikeda | |
| 2009/0175540 A1 | 7/2009 | Dariush et al. | |
| 2009/0183125 A1 | 7/2009 | Magal et al. | |
| 2009/0222134 A1 | 9/2009 | Franke et al. | |
| 2009/0225164 A1 | 9/2009 | Renkis | |
| 2009/0237499 A1 | 9/2009 | Kressel et al. | |
| 2009/0243844 A1* | 10/2009 | Ishidera | G08B 13/19615 340/540 |
| 2009/0251559 A1* | 10/2009 | Mekenkamp et al. | 348/222.1 |
| 2009/0252423 A1 | 10/2009 | Zhu et al. | |
| 2009/0268945 A1 | 10/2009 | Wilson et al. | |
| 2009/0316135 A1 | 12/2009 | Stein et al. | |
| 2010/0020078 A1 | 1/2010 | Shpunt | |
| 2010/0111358 A1* | 5/2010 | Chai et al. | 382/103 |
| 2010/0118123 A1 | 5/2010 | Freedman et al. | |
| 2010/0146455 A1 | 6/2010 | Wilson et al. | |
| 2010/0146464 A1 | 6/2010 | Wilson et al. | |
| 2010/0194583 A1 | 8/2010 | Kawabata | |
| 2010/0194762 A1 | 8/2010 | Latta et al. | |
| 2010/0225746 A1 | 9/2010 | Shpunt et al. | |
| 2010/0265316 A1 | 10/2010 | Sali et al. | |
| 2010/0277109 A1* | 11/2010 | Crookham et al. | 315/363 |
| 2010/0290698 A1 | 11/2010 | Freedman et al. | |
| 2010/0303289 A1 | 12/2010 | Polzin et al. | |
| 2010/0303303 A1 | 12/2010 | Shen et al. | |
| 2010/0306712 A1 | 12/2010 | Snook et al. | |
| 2010/0306713 A1 | 12/2010 | Geisner et al. | |
| 2011/0001799 A1 | 1/2011 | Rothenberger et al. | |
| 2011/0001813 A1* | 1/2011 | Kim | G06K 9/00355 348/77 |
| 2011/0006912 A1 | 1/2011 | Sheardown et al. | |
| 2011/0025827 A1 | 2/2011 | Shpunt et al. | |
| 2011/0026029 A1* | 2/2011 | Iwasaki et al. | 356/417 |
| 2011/0050878 A1* | 3/2011 | Wells et al. | 348/86 |
| 2011/0052006 A1 | 3/2011 | Gurman et al. | |
| 2011/0090343 A1* | 4/2011 | Alt et al. | 348/164 |
| 2011/0150333 A1 | 6/2011 | Suenaga et al. | |
| 2011/0164032 A1 | 7/2011 | Shadmi | |
| 2011/0173574 A1 | 7/2011 | Clavin et al. | |
| 2011/0199291 A1 | 8/2011 | Tossell et al. | |
| 2011/0211754 A1 | 9/2011 | Litvak et al. | |
| 2011/0273723 A1 | 11/2011 | Haberer et al. | |
| 2011/0279261 A1 | 11/2011 | Gauger et al. | |
| 2011/0285620 A1 | 11/2011 | Latta et al. | |
| 2011/0285626 A1 | 11/2011 | Latta | |
| 2011/0288667 A1 | 11/2011 | Noda et al. | |
| 2011/0289579 A1 | 11/2011 | Davis et al. | |
| 2011/0292036 A1 | 12/2011 | Sali et al. | |
| 2011/0293137 A1 | 12/2011 | Gurman et al. | |
| 2011/0295399 A1 | 12/2011 | Plociennik et al. | |
| 2011/0298579 A1 | 12/2011 | Hardegger et al. | |
| 2011/0310010 A1 | 12/2011 | Hoffnung et al. | |
| 2011/0313325 A1 | 12/2011 | Cuddihy | |
| 2012/0038986 A1 | 2/2012 | Pesach | |
| 2012/0047468 A1 | 2/2012 | Santos et al. | |
| 2012/0050157 A1 | 3/2012 | Latta et al. | |
| 2012/0070070 A1 | 3/2012 | Litvak | |
| 2012/0072032 A1* | 3/2012 | Powell et al. | 700/278 |

(56) References Cited

U.S. PATENT DOCUMENTS

| | | |
|---|---|---|
| 2012/0074296 A1 | 3/2012 | Hammes et al. |
| 2012/0092485 A1 | 4/2012 | Meinherz et al. |
| 2012/0095575 A1 | 4/2012 | Meinherz et al. |
| 2012/0101411 A1 | 4/2012 | Hausdorff et al. |
| 2012/0140042 A1* | 6/2012 | Albertson et al. ............... 348/46 |
| 2012/0146789 A1* | 6/2012 | De Luca et al. ............... 340/540 |
| 2012/0150333 A1 | 6/2012 | De Luca et al. |
| 2012/0150487 A1 | 6/2012 | De Coi |
| 2012/0169583 A1 | 7/2012 | Rippel et al. |
| 2012/0182155 A1 | 7/2012 | Sato et al. |
| 2012/0242800 A1* | 9/2012 | Ionescu ................... G06F 3/017 348/46 |
| 2012/0268261 A1 | 10/2012 | Frederick et al. |
| 2012/0290121 A1 | 11/2012 | Gronbach |
| 2012/0314901 A1 | 12/2012 | Hanson et al. |
| 2012/0327241 A1* | 12/2012 | Howe ........................... 348/155 |
| 2013/0163879 A1* | 6/2013 | Katz et al. ..................... 382/195 |
| 2013/0170699 A1 | 7/2013 | Bran et al. |
| 2013/0182905 A1* | 7/2013 | Myers et al. ................... 382/103 |
| 2013/0188031 A1* | 7/2013 | Park ....................... H04N 7/002 348/77 |
| 2013/0226643 A1* | 8/2013 | Sakaue .......... G06Q 10/063114 705/7.15 |
| 2013/0300566 A1 | 11/2013 | Kumfer et al. |
| 2013/0342636 A1* | 12/2013 | Tian ........................ G06F 3/017 348/14.08 |
| 2014/0067121 A1 | 3/2014 | Brooks et al. |
| 2014/0071037 A1 | 3/2014 | Cohen et al. |
| 2014/0128955 A1 | 5/2014 | Howard et al. |
| 2014/0299775 A1* | 10/2014 | Kimmel ..................... 250/341.8 |
| 2015/0049911 A1 | 2/2015 | Doettling et al. |

* cited by examiner

RECOGNITION-BASED INDUSTRIAL AUTOMATION CONTROL WITH PERSON AND OBJECT DISCRIMINATION

BACKGROUND

The disclosure relates generally to systems and methods for controlling devices within an industrial automation system. More particularly, embodiments of the present disclosure are related to systems and methods for controlling devices in the industrial automation system using range camera systems disposed within the industrial automation system.

Industrial automation systems are managed and operated using automation control and monitoring systems. A wide range of applications exist for automation control and monitoring systems, particularly in industrial automation settings. Such applications may include the powering of a wide range of actuators, such as valves, electric motors, and so forth, and the collection of data via sensors. Typical automation control and monitoring systems may include one or more components, such as: programming terminals, automation controllers, input/output (I/O) modules, communication networks, and/or human-machine interface (HMI) terminals.

Generally, certain safety precautions are taken to ensure that devices in industrial automation systems are operated safely. However, conventional industrial automation systems are limited in controlling its devices using the typical automation control and monitoring systems described above. Although these automation control and monitoring systems may be used to manage the operations of the devices within the industrial automation system, improved systems and methods for safely operating devices within an industrial automation system are desirable.

BRIEF DESCRIPTION

In one embodiment, a method for performing industrial automation control in an industrial automation system may include detecting, via a sensor system, positions and/or motions of one or more humans and/or one or more objects in an industrial automation system and distinguishing, via a programmed computer system, between one or more humans and one or more objects based upon the detected positions and/or motions. The method may then include implementing a control and/or notification action based upon the distinction.

In another embodiment, a system for performing industrial automation control may include a sensor system configured to detect positions and/or motions of an element in an industrial system. The system may also include a processing component that may determine whether the element corresponds to one or more humans or one or more objects based on the detected positions and/or motions. The processing component may also send a command to an environment control device in the industrial system based upon whether the element corresponds to one or more humans or the one or more objects.

In yet another embodiment, a method for performing industrial automation control may include detecting, via a sensor system, positions and/or motions of one or more humans in an industrial automation system and determining, via a programmed computer system, whether the one or more one or more humans are associated with an authorized status based upon the detected positions and/or motions. The method may then include implementing a control and/or notification action based upon the distinction.

DRAWINGS

These and other features, aspects, and advantages of the present invention will become better understood when the following detailed description is read with reference to the accompanying drawings in which like characters represent like parts throughout the drawings, wherein.

Figure 1:
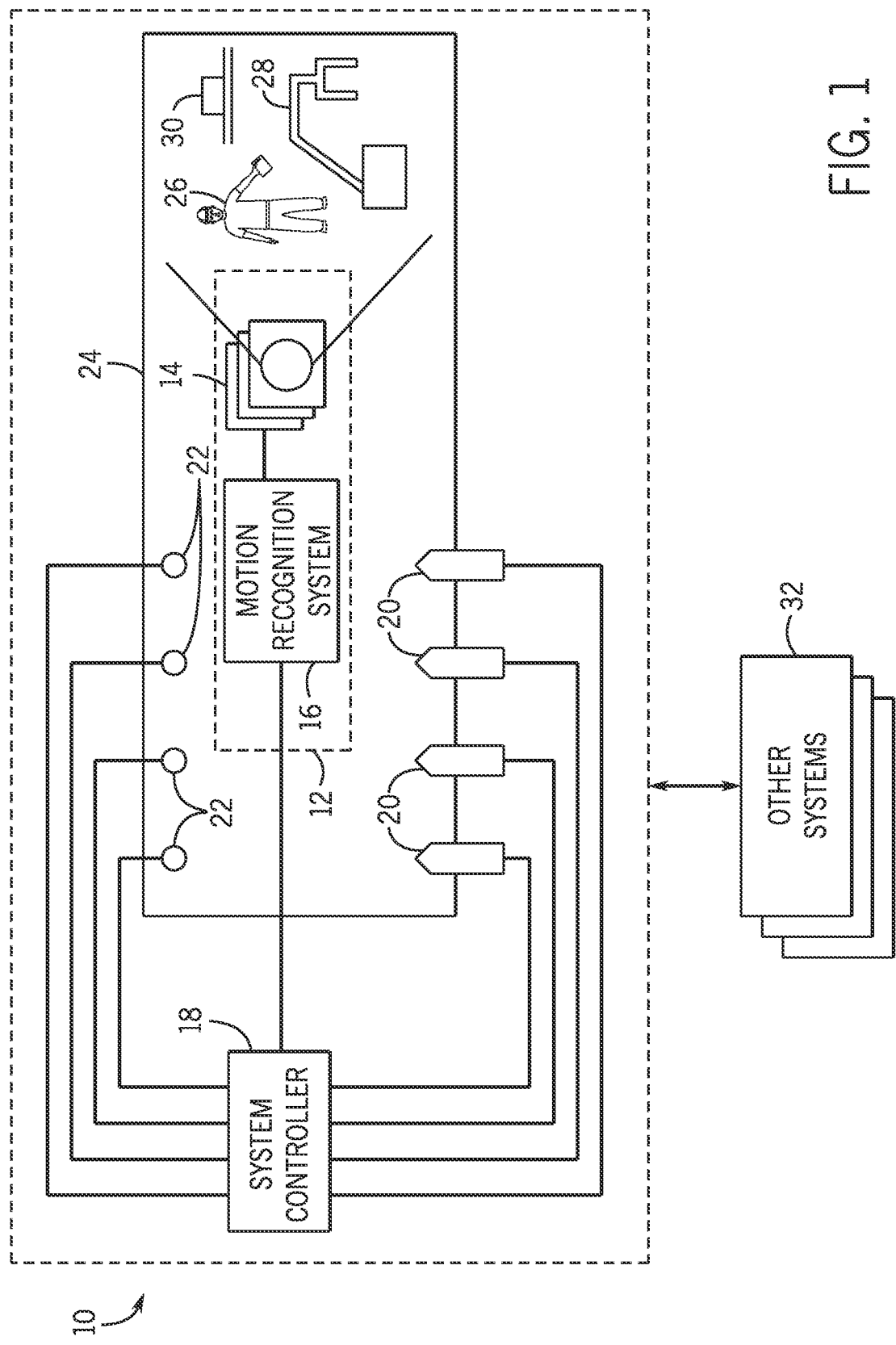
FIG. 1 is a block diagram of a range camera system operating within an industrial automation system, in accordance with an embodiment.
Figure 3:
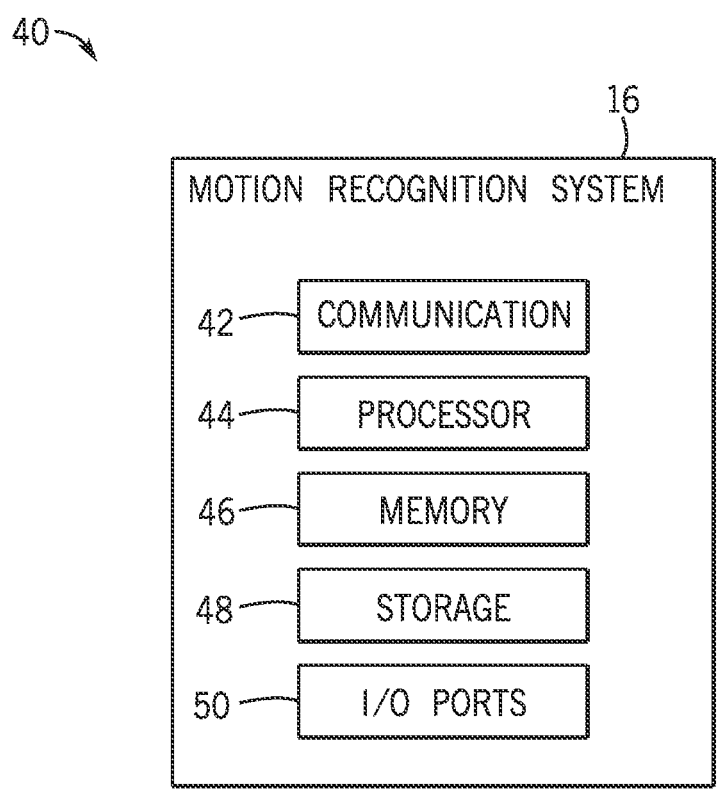
FIG. 3 is a block diagram of a motion recognition system within the range camera system of FIG. 1, in accordance with an embodiment.
Figure 12:
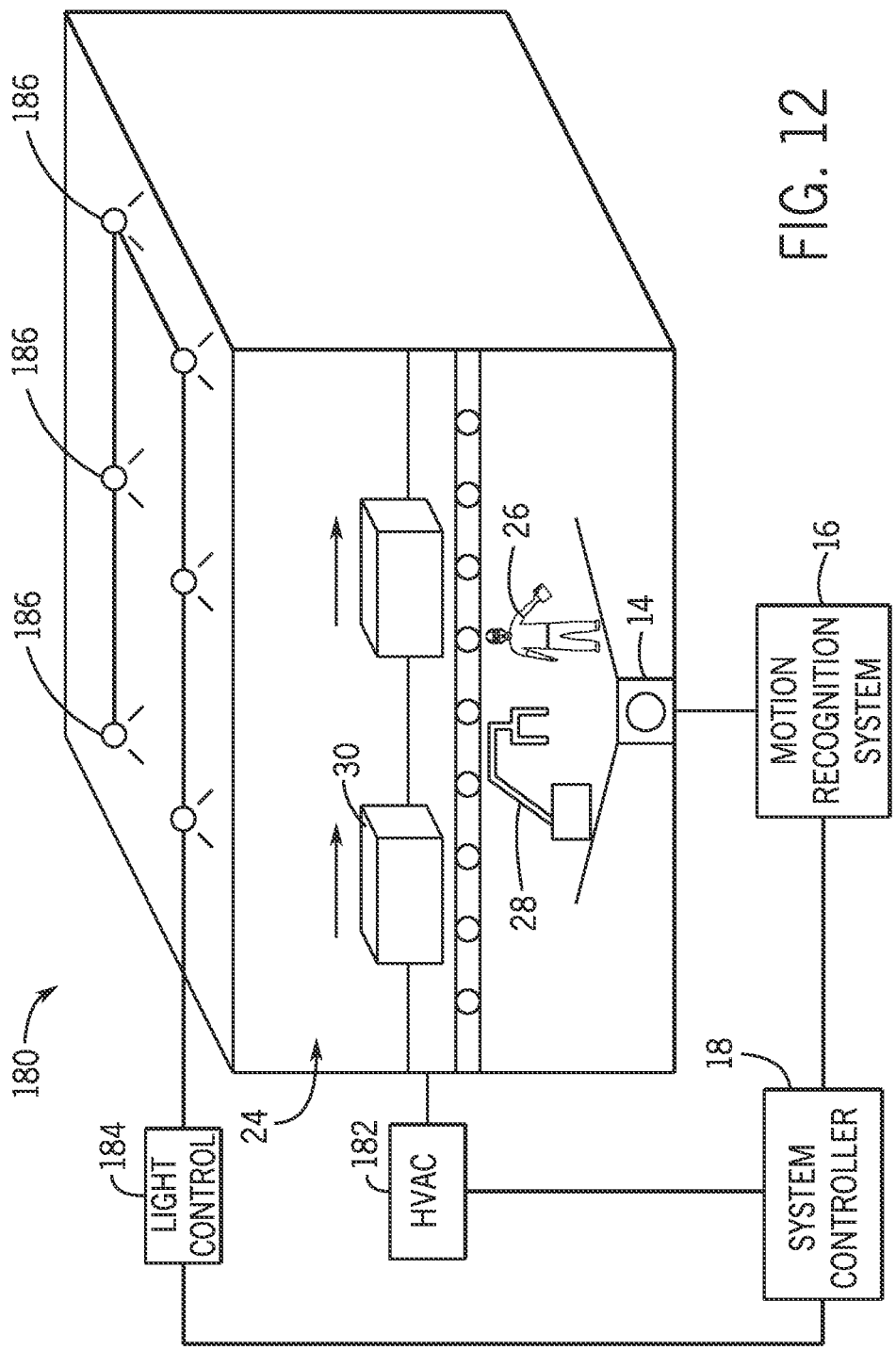
Figure 13:
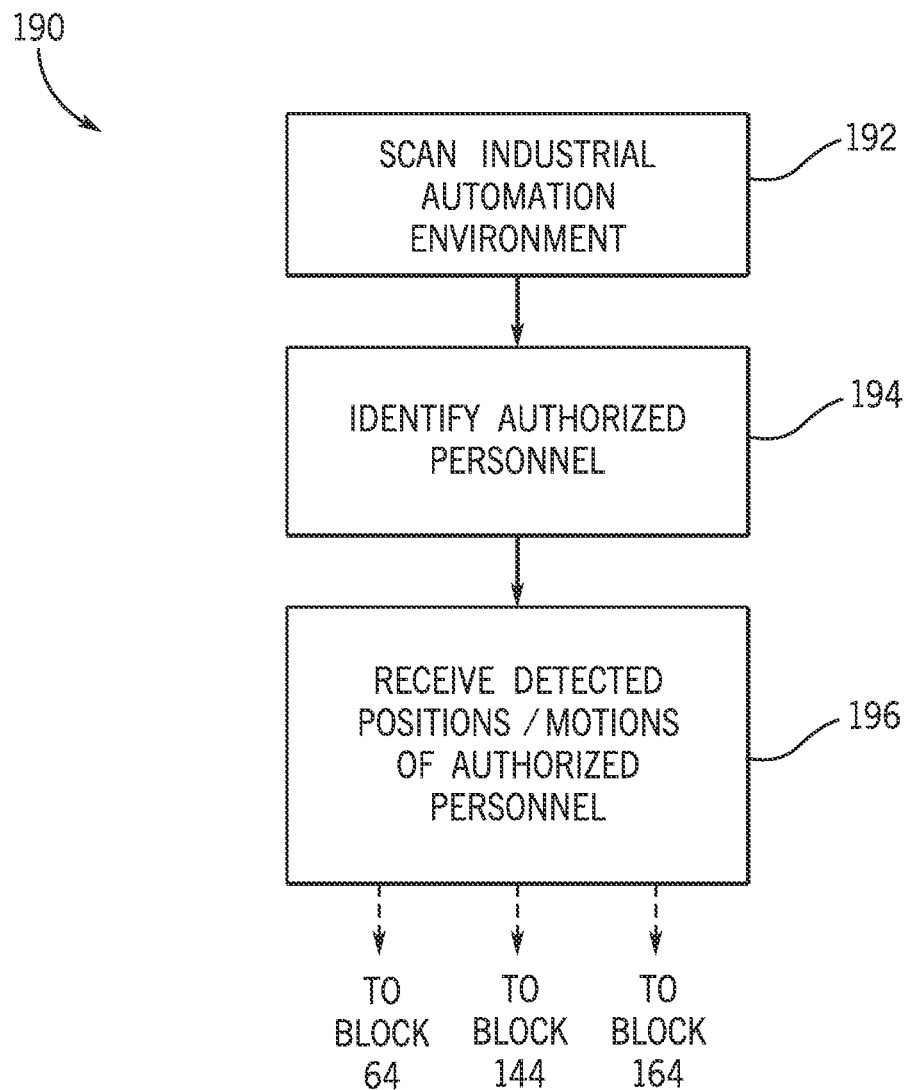

FIG. 12 is a block diagram of a environment control system operating in conjunction with the motion recognition system of FIG. 3, in accordance with an embodiment; and FIG. 13 is a flow chart of a method for controlling one or more devices within the industrial automation system based on distinguishing features between humans present in the industrial automation system as detected by the range camera system of FIG. 1, in accordance with an embodiment.

DETAILED DESCRIPTION

The present disclosure is generally directed towards a range camera system disposed in an industrial automation system that may detect positions and/or motions of persons and/or objects within a space encompassing the industrial automation system. After detecting the positions and/or motions, the range camera system may perform various operations in the industrial automation system based on those detected positions and/or motions. That is, the range camera system may detect the positions and/or motions of persons and/or objects (e.g., robots, autonomous guided vehicles, or machines) within the industrial automation system space and use the detected positions and/or motions to control various industrial automation devices in the industrial automation system. In addition to detecting positions and/or motions within the industrial automation system, the range camera system may compute a confidence value for each detected position and/or motion. The confidence value may relate to a degree or percentage in which the remote camera system may be certain in the detected position and/or motion. As such, in certain embodiments, the range camera system may send control signals to various devices in the industrial automation system based on the confidence values that correspond to the respective detected positions and/or motions. Additional details regarding the range camera system will be described below with reference to FIGS. 1-13.

By way of introduction, FIG. 1 is a block diagram of an industrial automation system 10 operating with a range camera system 12. The range camera system 12 may include one or more range cameras 14 and a motion recognition system 16. The range camera 14 may include any type of camera or sensor system that may detect positions and/or movements of any element in its viewing window. In certain embodiments, the range camera 14 may employ various types of technology to enable it to detect positions and movement. By way of example, the range camera 14 may include digital cameras, video cameras, infrared sensors, optical sensors (e.g., video/camera), radio frequency energy detectors, sound sensors, sonar sensors, vibration sensors, magnetic sensors, and the like to detect the positions and/or movements of any element in its viewing window. The sensors used for the range camera 14 may be capable of detecting sonar waveforms, heat signatures, lasers, floor pressure signatures, air pressure characteristics, and the like.

The range camera 14 may also include a sensor that may employ range imaging technology or techniques to produce two-dimensional or three-dimensional images that may be used to indicate the distance between various points in an image acquired by the sensor and the location of the sensor. As such, the sensor employed with range imaging technology may operate according a number of techniques such as stereo triangulation, sheet of light triangulation, structured light, time-of flight, interferometry, coded aperture, and the like.

The detected positions and/or motions received by the range camera 14 may be input into the motion recognition system 16, which may interpret the detected positions and/or motions and determine various automation commands that may correspond to the detected positions and/or motions. After determining the automation command that corresponds to the detected positions and/or motions, the motion recognition system 16 may send the automation command to the system controller 18, which may implement the automation command on an industrial automation device 20 coupled to the system controller 18. For instance, the motion recognition system 16 may receive a detected motion from the range camera 14 and may interpret the detected motion as a command to stop one of the devices 20 in the industrial automation system 10. As such, the motion recognition system 16 may send a signal to the system controller 18 to stop the respective industrial automation device 20.

Industrial automation devices 20 may include any type of machine or device that may operate within the industrial automation system 10. Examples of industrial automation devices 20 may include, but are not limited to, actuators, electric motors, electric presses, and the like. Generally, the industrial automation devices 20 may be operated or controlled by the system controller 18. As such, the system controller 18 may have a processor component, a memory component, a communication component, and the like such that it may operate the industrial automation devices 20 by sending control signals to the industrial automation devices 20. In certain embodiments, in addition to receiving automation commands from the motion recognition system 16, the system controller 18 may receive various types of information from various sensors 22 in the industrial automation system 10. The sensors 22 may be any type of sensor such as a push-button sensor, a gas sensor, a temperature sensor, and the like that may be used to provide information to the system controller 18. As such, the system controller 18 may operate the industrial automation devices 20 based on the information received by the sensors 22, the automation commands interpreted by the motion recognition system 16, or both.

Keeping the foregoing in mind, in certain embodiments, the range camera system 12, the industrial automation devices 20, and the sensors 22 may generally be disposed in a space that may be characterized as part of an industrial automation environment 24. The industrial automation environment 24 may include a physical space within the industrial automation system 10 in which human operators 26, machines 28, or material 30 may perform various actions to operate the industrial automation system 10. As such, the range camera system 12 may monitor the positions and/or motions of the humans 26, the machines 28, or the material 30 as they move within the industrial automation environment 24.

The humans 26 may include any person that may be present in the industrial automation environment 24. Generally, the humans 26 present in the industrial automation environment 24 may include persons trained and authorized to have access to the industrial automation environment 24. The humans 26 may perform various operations such as maintenance and the like for any device in the industrial automation system 10. However, it should be noted that the humans 26 may also include persons who are not authorized or are undesirable persons (e.g., intruders) present in the industrial automation environment 24. As such, in one embodiment, the range camera system 12 may be used to detect whether the humans 26 in the industrial automation environment 24 are authorized to be in the industrial automation environment 24 and send a notification or automation command to the system controller 18 based on whether the detected human(s) 26 is authorized or expected to be in the industrial automation environment 24.

The machines 28 may include any automated or non-automated machine present in the industrial automation environment 24. As such, the machines 28 may include robots or mechanical devices that perform various operations on items being manufactured, processed, or the like. For example, the machine 28 may include a mechanical claw that may move articles within the industrial automation system. In certain embodiments, the machine 28 may include industrial automation devices 20 operating within the view window of the range camera 14.

The material 30 may include items such as workpieces being moved by the machine 28 or the items being manufactured or processed in the industrial automation system 10. For instance, FIG. 1 depicts the material 30 as a box on a conveyor belt. In this instance, the range camera system 12 may track the positions of the material 30 as it moves along the conveyor belt. The motion recognition system 16 may then send information related to the positions of the material 30 to the system controller 18, which may use that information to control various industrial automation devices 20. For instance, if the system controller 18 determines that the positions of the material 30 on the conveyor belt is changing too slowly, the system controller 18 may interpret that information as indicating that the material 30 is moving too slowly along the conveyor belt. As such, the system controller 18 may send a signal to an industrial automation device 20, such as a motor drive coupled to a motor that controls the movement of the conveyor belt, to increase the speed of the motor, thereby increasing the speed at which the material 30 may move along the conveyor belt.

In certain embodiments, the range camera 14 may be coupled to various components in the industrial automation system 10 such as the industrial automation device 20 or the like such that the range camera 14 may monitor the movements and/or positions of various elements within the industrial automation system 10. For instance, the range camera 14 may be coupled to a DIN rail that may be fixed at various locations in the industrial automation system 10, the industrial automation device 20, or the like.

In any case, by using the range camera system 12 to monitor various elements within the industrial automation system 10, the system controller 18 may better manage the safe operations of the industrial automation system 10. For instance, information acquired from the range camera system 12 may be used to determine the location of the human 26 with respect to a potential hazard such as a moving industrial automation device 20, a high-temperature industrial automation device 20, high-voltage equipment, and the like. In certain embodiments, the range camera system 12 may process data related to body extremity of the human 26 that may be moving and the speed at which it may be moving to predict whether the movement may cause the human 26 to come in physical contact with a hazardous zone, a machine 28, or the like.

For instance, the range camera system 12 may process data received from the range camera 14 indicating the positions and movements of various joints of the human 26 to determine a probability of the human 26 physically contacting or entering a hazardous zone. As such, the range camera system 12 may predict that the human 26 may come in contact with the hazardous zone when the probability exceeds a threshold. By being able to predict these types of situations, the range camera system 12 may take preemptive measures in avoiding undesirable situations such as triggering an action to prevent the dangerous situation or minimize the adverse effects of the undesired situation. For example, the range camera system 12 may send the system controller 18 automation commands to stop or alter the operations of the industrial automation devices 20 or the machine 28 to such that the industrial automation devices 20 or the machine 28 avoid the human 26. Moreover, the range camera system 12 may also be used to restart or reengage the halted industrial automation devices 20 or machine 28 once the human 26 is no longer located within the hazardous zone.

The range camera system 12 may also send a notification to the system controller 18, other industrial automation systems 32, or the like indicating that the human 26 was located in the hazardous zone or that the respective industrial automation devices 20 were stopped due the presence of the human 26 in the hazardous zone. In this way, the other industrial automation systems 32 may modify their operations if it is determined that their operations will be affected by the data received by the motion recognition system 16.

In a similar fashion, the range camera system 12 may be used to monitor various the positions and/or motions of the machine 28 rather than, or in conjunction with, monitoring the positions and/or motions of the human 26. As such, the range camera system 12 may determine whether the machine 28 is operating safely within the industrial automation environment 24.

Figure 2:
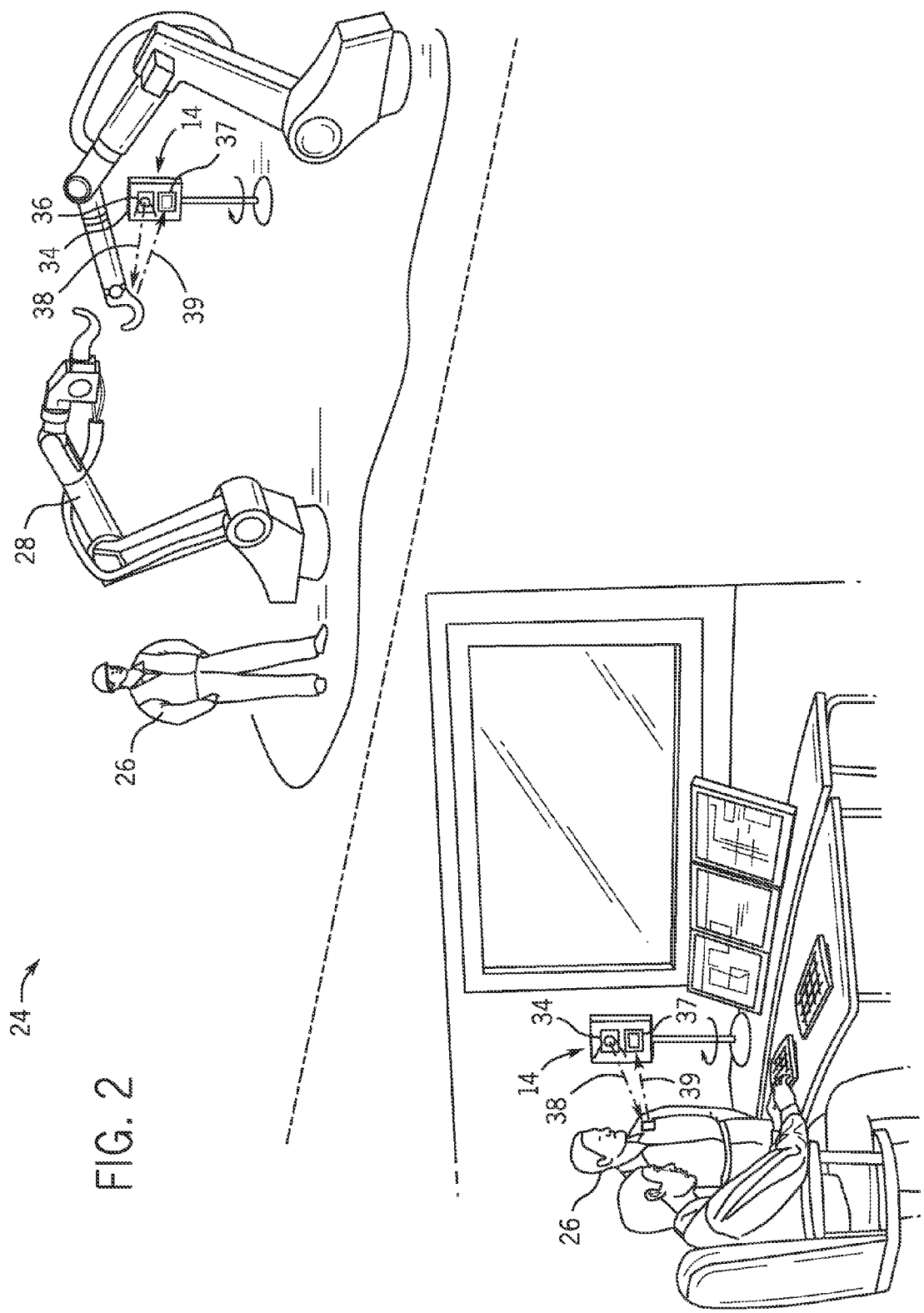
FIG. 2 is a block diagram of a range camera system employing a time-of-flight camera system operating within the industrial automation system of FIG. 1, in accordance with an embodiment.

By way of example, FIG. 2 depicts an example of the industrial automation environment 24 that uses a time-of-flight camera system 34 as the range camera 14 to perform the various techniques described herein. As shown in FIG. 2, the time-of-flight camera system 34 may be employed in the industrial automation environment 24 or in a controlled environment such as a power control room. The time-of-flight camera system 34 may include an illumination unit 36 and an image sensor 37 that may be used to determine the positions and/or motions of the human 26, the machine 28, or the like present in the industrial automation environment 24 or in the controlled environment. In one embodiment, the time-of-flight camera system 34 may rotate such that it may have a 360-degree line-of-sight around the industrial automation environment 24.

To determine the positions of the human 26 or the machine 28 in the industrial automation environment 24, the time-of-flight camera system 34 may use the illumination unit 36 to emit a light signal 38 outward into the industrial automation environment 24. The light signal 38 may include an intensity-modulated light in the near-infrared range, a laser, or the like. In any case, once the light signal 38 hits an element (i.e., the human 26 in FIG. 2), a reflected light signal 39 may be reflected back to the time-of-flight camera system 34 and into the image sensor 37. In one embodiment, the reflected light signal 39 may be projected into the image sensor 37 via a lens that may be disposed on the time-of-flight camera system 34. After sending the light signal 38 and receiving the reflected light signal 39, the time-of-flight camera system 34 may send data related to the times at which the light signal 38 was sent and the reflected light signal 39 was received to the motion recognition system 16 to determine a distance between the element and the time-of-flight camera system 34. That is, the motion recognition system 16 may correlate data related to the light signal 38 and the reflected light signal 39 such as the times at which the light signal 38 was sent and the reflected light signal 39 was received to determine a distance between the element and the time-of-flight camera system 34. By tracking this distance over time, the motion recognition system 16 may determine the positions of the element over time, the motion of the element, and the like.

In certain embodiments, the motion recognition system 16 may include three-dimensional motion paths that may define the path in which the machine 28 may operate within the industrial automation environment 24. The three-dimensional motion paths may be determined based on an expected motion of the machine 28 with respect to its function within the industrial automation system 10. As such, the motion recognition system 16 may detect whether the machine 28 is operating as expected with respect to the three-dimensional motion paths and/or whether the machine 28 is experiencing any hazardous movements (e.g., moving to fast, proximate to human 26). If the motion recognition system 16 detects that the machine 28 is operating unexpectedly or with certain hazardous movements, the motion recognition system 16 may send a signal to the system controller 18, which may be used to control the machine 28, to operate the machine 28 in a safe state, powered off, or the like.

Moreover, in some embodiments, the motion recognition system 16 may interpret the motion and/or the speed of the motion of the machine 28 or the human 26 to predict whether the machine 28 may enter a hazardous area or hazardous situation such as contacting the human 26. As such, the motion recognition system 16 may send a signal to the system controller 16 or directly to the machine 28 to alter the operation of the machine 28 such that the machine 28 may avoid entering the hazardous area or encountering the hazardous situation. That is, the motion recognition system 16 may control the operations of the machine 28 or any industrial automation device 20 based on the motions and/or the positions of the machine, the motions and/or the positions of the human 26, or the like, thereby operating the industrial automation system 10 more safely.

Keeping the foregoing in mind, FIG. 3 illustrates a detailed block diagram 40 of the motion recognition system 16. The motion recognition system 16 may include a communication component 42, a processor 44, a memory 46, a storage 48, input/output (I/O) ports 50, and the like. The communication component 42 may be a wireless or wired communication component that may facilitate communication between the system controller 18, the industrial automation devices 20, the range camera 14, the machine 28, other industrial automation systems 32, and the like. The processor 44 may be any type of computer processor or microprocessor capable of executing computer-executable code. The memory 46 and the storage 48 may be any suitable articles of manufacture that can serve as media to store processor-executable code, data, or the like. These articles of manufacture may represent computer-readable media (i.e., any suitable form of memory or storage) that may store the processor-executable code used by the processor 44 to perform the presently disclosed techniques. Generally, the motion recognition system 16 may receive motion and/or position data related to the human 26, the machine 28, and/or the material 30 and interpret the data to determine automation commands for the industrial automation devices 20. The memory 46 and the storage 48 may also be used to store the data, the respective interpretation of the data, and the automation command that corresponds to the data. Although the block diagram 40 is depicted with respect to the motion recognition system 16, it should be noted that the system controller 18 may also include the same components to perform the various techniques described herein. Additional details describing a method in which the motion recognition system 16 may use to interpret the motion and/or location data will be discussed below with reference to FIGS. 4-13.

Automation Commands Based on Detected Positions/Motions and Confidence Values

Figure 4:
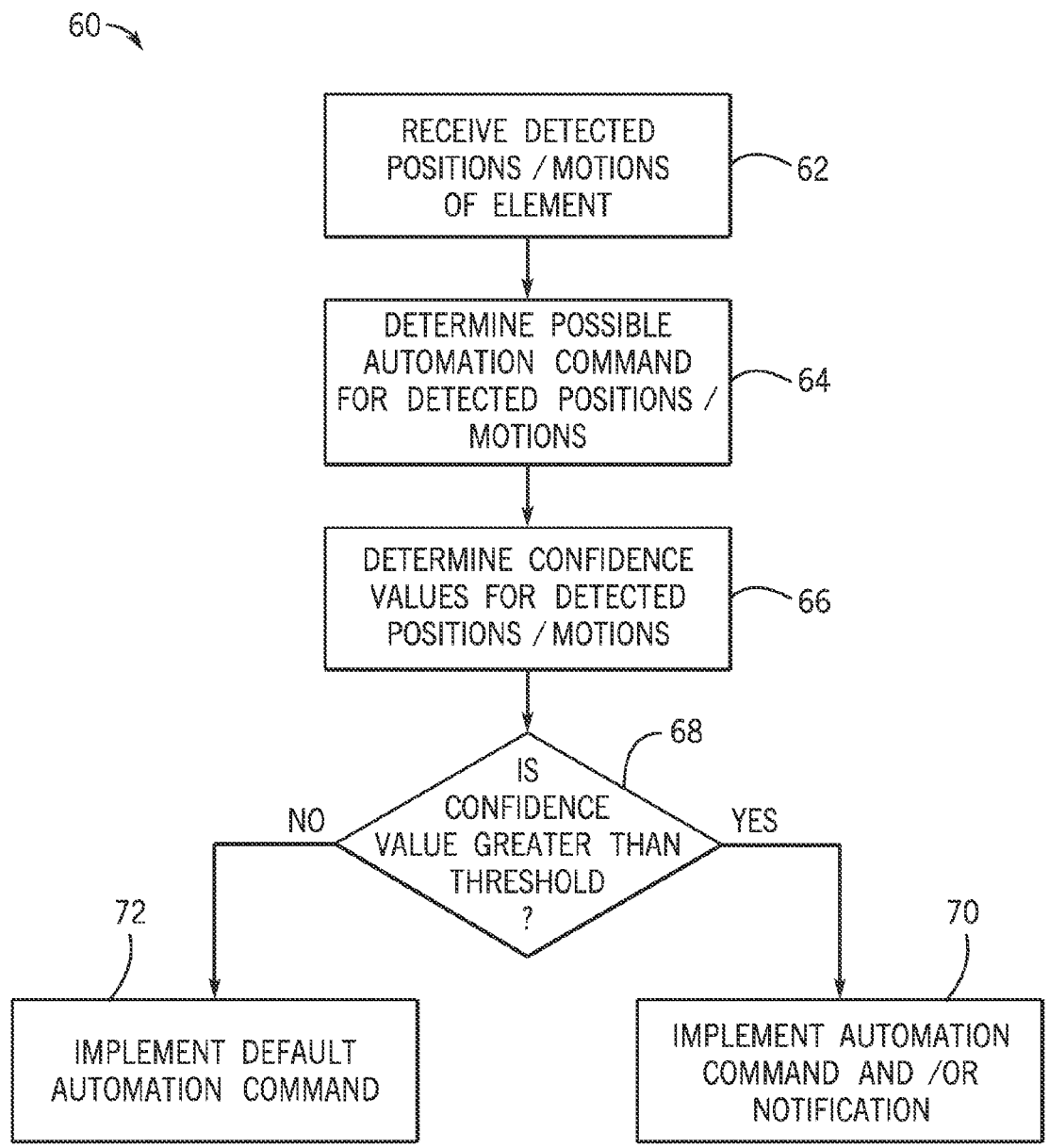
FIG. 4 is a flow chart of a method for controlling one or more devices within the industrial automation system using the range camera system of FIG. 1, in accordance with an embodiment.

Referring now to FIG. 4, a method 60 for implementing automation commands within the industrial automation system 10 based on detected positions and/or motions of an element within the viewable region of the range camera 14. In one embodiment, the techniques described herein with respect to the method 60 may be performed by the motion recognition system 16. As such, at block 62, the motion recognition system 16 may receive detected positions and/or motions of an element such as the human 26, the machine 28, or the material 30. That is, the range camera 14 may receive data related to the positions and/or motions of the element currently present within its viewing window.

In certain embodiments, the data related to the detected positions and/or motions may include one or more optic images of the element, one or more infrared images of the element, or the like. Once the range camera 14 acquires the images of the element, the motion recognition system 16 may convert the images into two-dimensional figures that represent the element. For instance, FIG. 5 illustrates an example of a two-dimensional representation 80 of the human 26 and FIG. 6 illustrates an example of a two-dimensional representation 100 of the machine 28.

Figure 5:
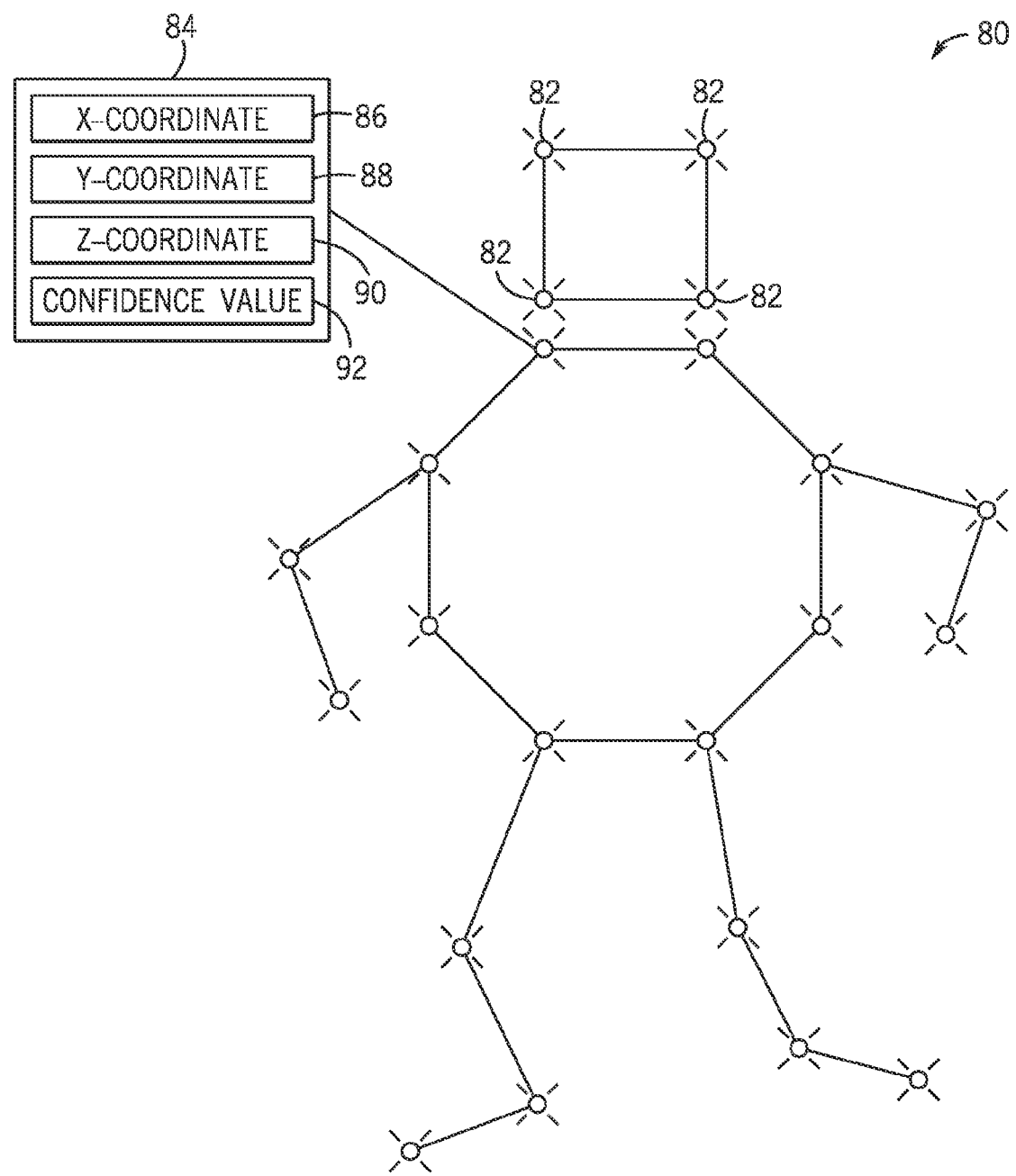
FIGS. 5-6 are example visualizations of data received by the motion recognition system of FIG. 3, in accordance with an embodiment.
Figure 6:
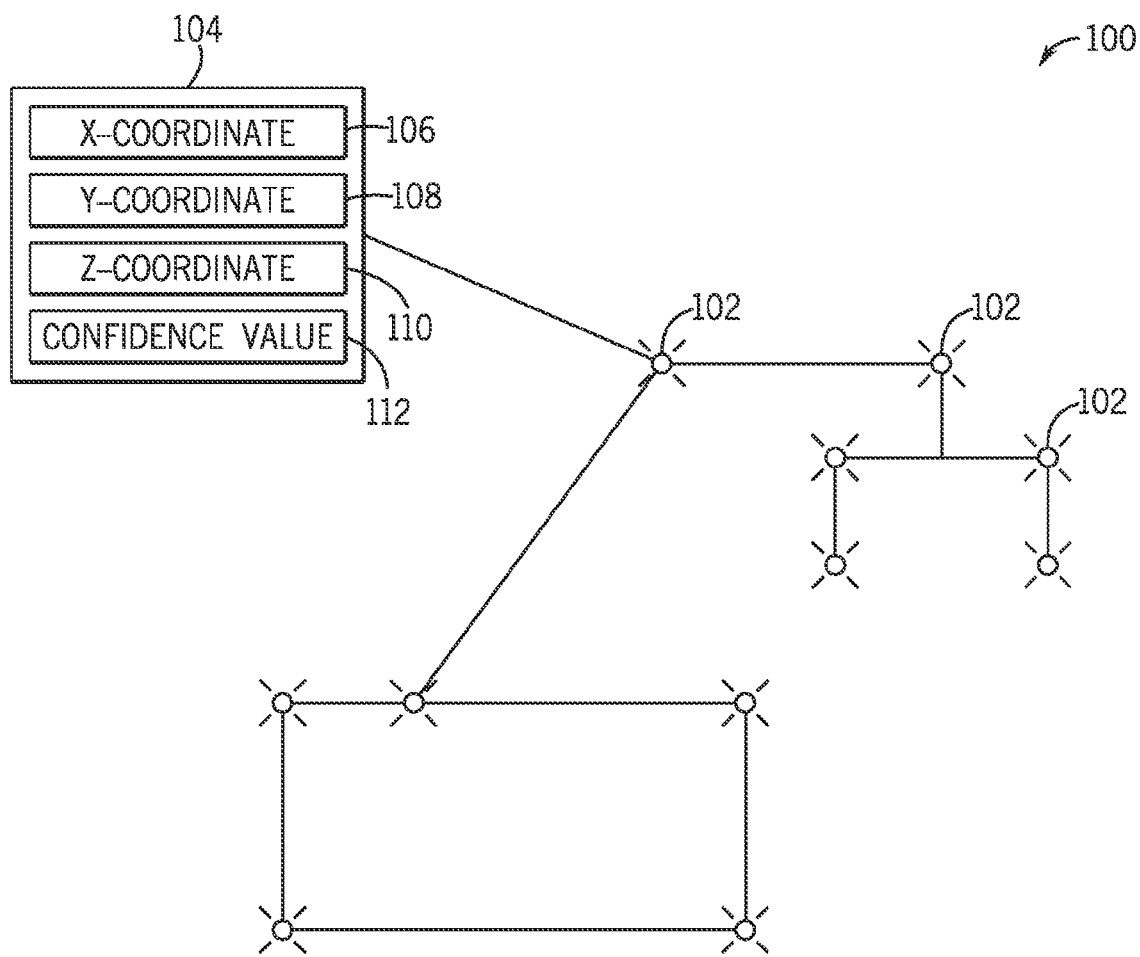

Referring briefly to FIG. 5, the two-dimensional representation 80 of the human 26 may include data points 82 at various edges or joints on the body of the human 26. Based on the distance between the range camera 14 and the human 26, the size of the two-dimensional representation 80, the relative distance between the two-dimensional representation 80 and other fixed objects within the view window of the range camera 14, and the like, the motion recognition system 16 may generate metadata 84 for each data point 82.

The metadata 84 may include certain details regarding the respective data point 82. By way of example, the metadata 84 may include an x-coordinate value 86, a y-coordinate value 88, a z-coordinate value 90, a confidence value 92, and the like. The confidence value 92 may correspond to a degree or amount in which the motion recognition system 16 may be certain of the x-coordinate value 86, the y-coordinate value 88, and the z-coordinate value 90. In some embodiments, the motion recognition system 16 may generate the confidence value 92 for each coordinate value. The confidence value 92 may be determined based on visibility of the data point 82, historical data related to the data point 82, or the like.

In the same manner, the two-dimensional representation 100 of the machine 28 may include data points 102 at various edges or joints on the body of the machine 28. Based on the distance between the range camera 14 and the machine 28, the size of the two-dimensional representation 100, the relative distance between the two-dimensional representation 100 and other fixed objects within the view window of the range camera 14, and the like, the motion recognition system 16 may generate metadata 104 for each data point 102.

Like the metadata 84 described above with reference to FIG. 5, the metadata 104 may include certain details regarding each respective data point 102 such as an x-coordinate value 106, a y-coordinate value 108, a z-coordinate value 110, a confidence value 112, and the like. Like the confidence value 92, the confidence value 102 may correspond to a degree or amount in which the motion recognition system 16 may be certain of the x-coordinate value 106, the y-coordinate value 108, and the z-coordinate value 110. In some embodiments, the motion recognition system 16 may generate the confidence value 112 for each coordinate value and may determine the confidence value 112 based on visibility of the data point 82, historical data related to the data point 82, an expected positions of the machine 28, or the like.

Keeping the foregoing in mind, the motion recognition system 16 may detect a motion or movement pattern of the element based on how the positions of the data points 82 or 102 change over time. In one embodiment, the motion recognition system 16 may acquire the metadata 84 or 104 related to each data point 82 or 102 and store the metadata 84 or 104 in the memory 46 or the storage 48. The processor 44 of the motion recognition system 16 may then analyze the collection of metadata 84 or 104 to determine how the element is moving. As such, the motion recognition system 16 may recognize the motion or gestures of the element.

Figure 7:
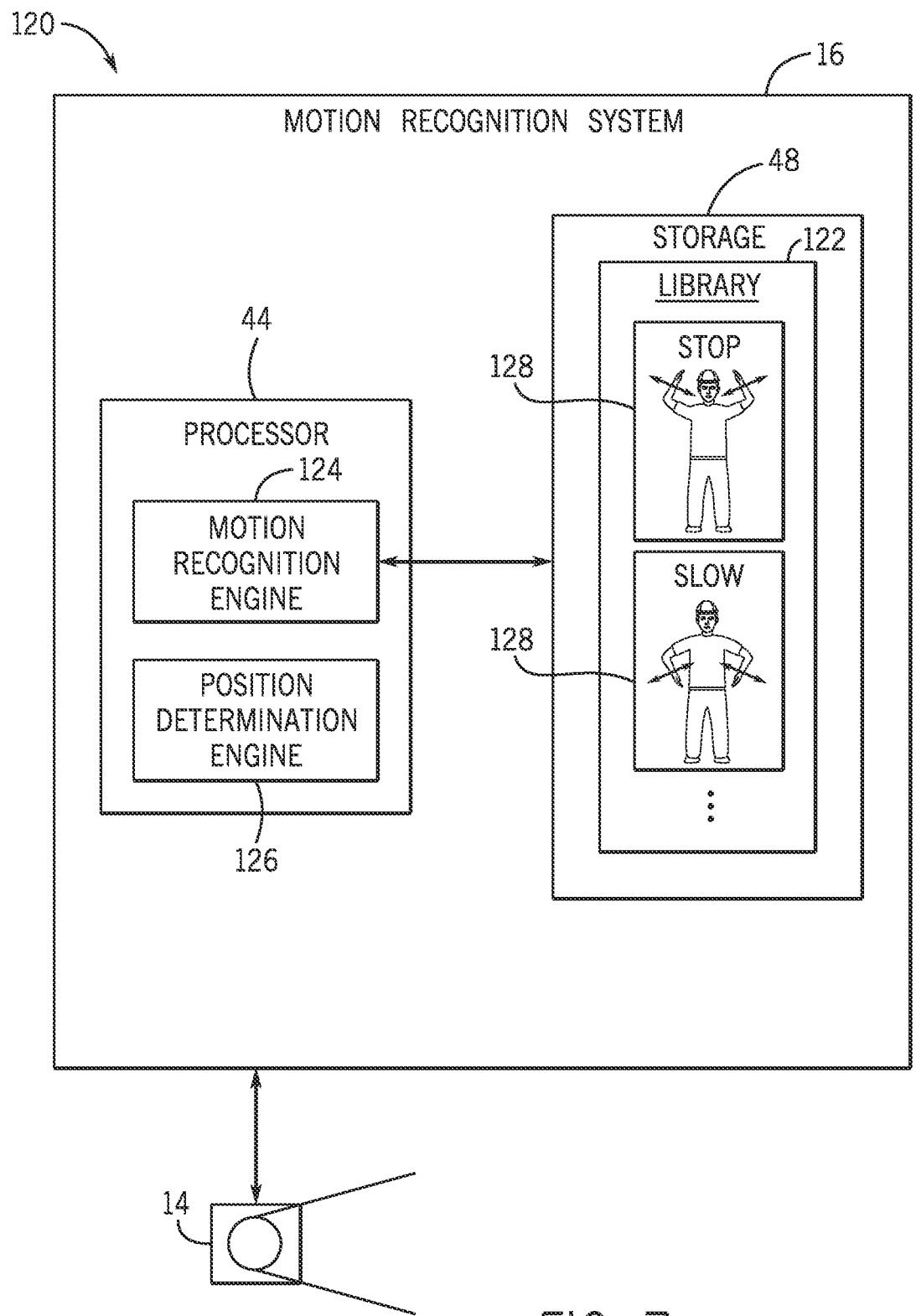
FIG. 7 is a block diagram of a motion recognition engine and a position determination engine within the motion recognition system of FIG. 3, in accordance with an embodiment.

Referring back to FIG. 4, at block 64, the motion recognition system 16 may determine a possible automation command for the detected motions received at block 62. In one embodiment, to determine the possible automation command, the motion recognition system 16 may compare the detected positions and/or motions to a library of automation commands related to detected positions and/or motions. FIG. 7 illustrates an example of a library 122 of automation motion commands that may be stored in the storage 48 of the motion recognition system 16.

The library 122 may include a list of expected motions by the element and a corresponding automation command. The list of expected motions may be programmed into the library using a learning mode or the like with the motion recognition system 16. As such, an operator or technician may provide an input to the motion recognition system 16 indicating an automation command for a particular industrial automation device 20. The operator may then position himself within the view window of the range camera 14 and perform various movements or gestures that he intends to be associated with the inputted automation command. As such, the motion recognition system 16 may record how the data points 82 move or a pattern of motion of the data points 82 that correspond to the human 26. The motion recognition system 16 may then store the pattern of motion of the data points 83 (automation commands 128) in the library 122 and associated the pattern with the respective input automation command.

For example, the operator may provide an input to the motion recognition system 16 to enter into a learning mode and specify that the a particular motion or gesture should be associated with an emergency stop an automation command for a particular automation device 20. After receiving these inputs, the motion recognition system 16 may detect the movements that correspond to the data points 82 of the operator, which may include, for instance, holding one arm out straight with a palm out and figures up, while the operator is in the view window of the range camera 14. Once the motion recognition system 16 detects the motion, the motion recognition system 16 may store the movement of the data points 82 (automation command 128) with an association to an emergency stop automation command in the library 122. In certain embodiments, the motion recognition system 16 may enter and exit the learning mode by receiving some input from the operator that does not include any detected motion or gesture. In this case, the configuration of the learning mode may be secured and may not be compromised by any inadvertent motions or gestures.

In certain embodiments, the processor 44 may include a motion recognition engine 124 that may identify an automation command 128 from the library 122 based on the detected positions and/or motions of the element. For example, if the motion recognition engine 124 detects that the human 26 is waving both of his arms left and right, the motion recognition engine 124 may compare the detected motion to the motions or patterns of motion stored in the library 122 and determine that the motion corresponds to a stop automation command for a particular industrial automation device 20.

The library 122 may include a number of motions and a corresponding automation command 128 for each motion. The automation commands may include any command to control the automation devices 20, the machine 28, or any other device in the industrial automation system 10. As such, the automation commands may include, but are not limited to, starting a device, stopping a device, increasing a speed or output of a device, decreasing a speed or output of a device, and the like. Moreover, the library 122 may include other commands associated with various motions such as disabling the motion recognition system 16, limiting the control or ability of an operator to engage with the motion recognition system 16, or the like. In certain embodiments, the library 122 may include motions with respect to fixed objects in the industrial automation environment 24. For instance, a motion of the human 26 moving in the direction of some control input device, such as an emergency stop input, may be associated with an automation command for that control input device (e.g., emergency stop).

While the motion recognition engine 124 may be used to determine a possible automation command for the detected motions received at block 62, a position determination engine 126 may be used to determine a possible automation command for the detected positions received at block 62. As such, the position determination engine 126 may determine the positions of the data points 82 and 102 and may consult the library 122 to identify an automation command 128 that corresponds to the detected positions received at block 62. In this manner, the library 122 may include rules or scenarios in which certain automation commands may be implemented based on the positions of the data points 82 and 102.

Figure 8:
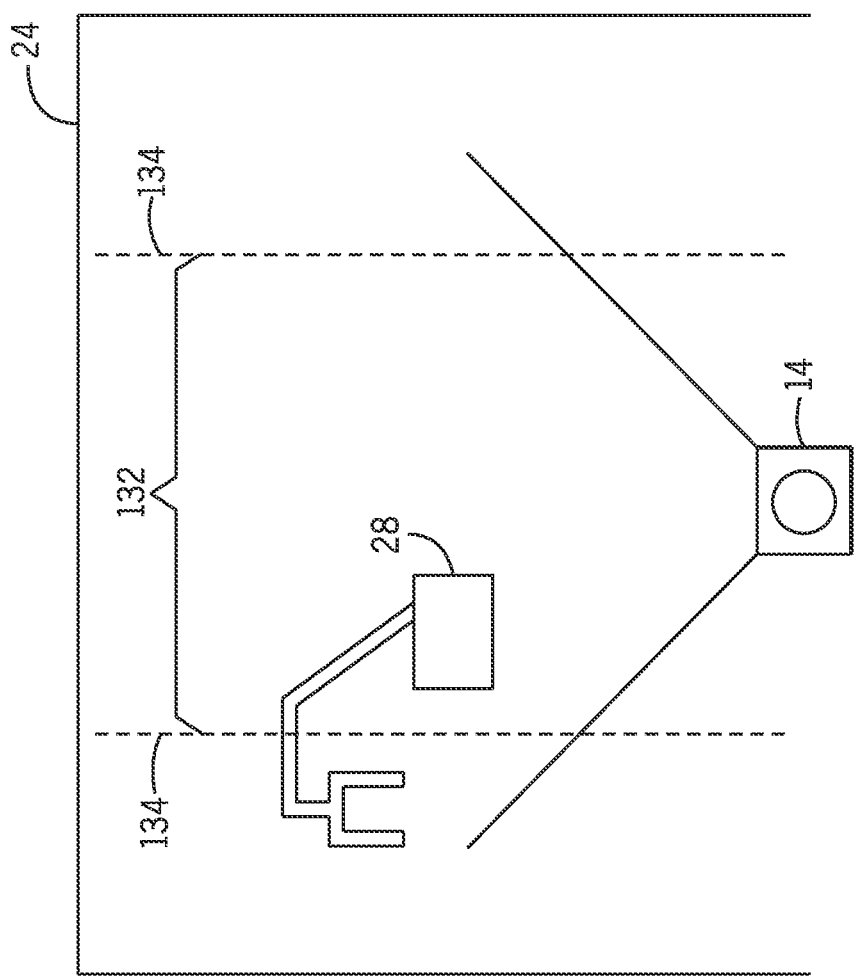
FIG. 8 is a block diagram of a machine operating within the industrial automation system of FIG. 1, in accordance with an embodiment.

Keeping this in mind, FIG. 8 illustrates a space 132 within the industrial automation environment 24 that may be designated as hazardous areas or areas in which the human 26 should not enter or in which only the machine 28 should operate. As such, the library 122 may include an automation command 128 to stop certain industrial automation devices 20 that may potentially cause harm to the human 26 when the human 26 is detected in the hazardous area.

For instance, in one embodiment, the space 132 may be marked by borders 134, which may be implemented using a light curtain, electric markers, colored markers, or the like. As such, the library 122 may include an automation command to stop industrial automation devices 20 or machines 28 when one or more humans 26 are present within the space 132. In another example, the library 122 may include an automation command to stop the operation of the industrial automation device 20 or the machine 28 when the human 26 or an extremity of the human 26 is located within an operating space of the industrial automation device 20 or the machine 28. For instance, if the industrial automation device 20 corresponds to an industrial press machine that compacts material, the library 122 may include an industrial automation command that stops the operation of the industrial press machine when the human 26 or an extremity of the human 26 is detected within the area of the industrial press machine where the material is expected to be placed.

Referring back to FIG. 4, at block 66, the motion recognition system 16 may determine the confidence value 92 or 112 for the detected positions and/or motions received at block 62. As mentioned above, the motion recognition system 16 may determine the confidence value 92 or 112 based on visibility of the data point 82 or 102, historical data related to the data point 82 or 102, expected positions of the human 26, the machine 28, or the material 30, or the like. In one embodiment, the motion recognition system 16 may also determine a confidence value for the possible automation command determined at block 64 based on the confidence value 92 or 112, the difference between the detected positions and/or motions determined at block 62 and the positions and/or motions associated with the possible automation command received at block 64, and the like. In another embodiment, the confidence value may be related to the difference between the detected positions and/or motions received at block 62 and an expected pattern of motion for the element.

In certain embodiments, the motion recognition system 16 may determine a confidence value for the detected positions and/or motions based on whether the corresponding element is within a particular range. For instance, if the element that corresponds to the detected positions and/or motions is within a close range of the camera 14, the detected positions and/or motions may be associated with higher confidence values as compared to elements that may be further from the camera 14. The confidence values may also be stored in an array that may be organized based on a distance between the detected element and the camera 14. As such, the motion recognition system 16 may determine a confidence value for a detected positions and/or motions based on a confidence value as listed in the array.

At block 68, the motion recognition system 16 may determine whether the confidence value determined at block 66 is greater than some threshold. If the confidence value determined at block 66 is greater than the threshold, the motion recognition system 16 may proceed to block 70 and implement the automation command determined at block 64. In addition to or in lieu of implementing the automation command, the motion recognition system 16 may send a notification to an administrator or operator of the industrial automation system 10 indicating that the automation command is being implemented or the like.

When implementing the determined automation command, in one embodiment, the motion recognition system 16 may associate the determined automation command with a particular industrial automation device 20. That is, upon determining the automation command based on the detected positions and/or motions of the element, the motion recognition system 16 may determine which automation device 20 or machine 28 to implement the determined automation command based on the positions of the data points 82 and 102 within a proximity of a device in the industrial automation system 10. For example, if the motion recognition system 16 interprets motions detected by the range camera 14 to correspond to stopping an industrial automation device 20, the motion recognition system 16 may then, at block 70, implement the automation command on the industrial automation device 20 that is within the closest proximity to the element.

Referring back to block 68, if the confidence value determined at block 66 is not greater than the threshold, the motion recognition system 16 may proceed to block 72 and implement a default automation command. The default automation command may be a safe state command for respective automation device 20 or machine 28. In one embodiment, the default automation command may include continuing the operation of the respective industrial automation device 20. In another embodiment, at block 72, the motion recognition system 16 may send a notification requesting a manual confirmation of the automation command determined at block 64 or a notification indicating that the confidence level is low for the respective automation command.

Automation Commands Based on Detected Positions/Motions and Secondary Input

By determining whether to implement the recognized automation command based on the confidence value, the motion recognition system 16 may be safeguarded or protected against interpreting random movements and/or positions of the human 26, the machine 28, or the material 30 as possible automation commands. However, in certain embodiments, to better ensure that the appropriate automation command is being recognized by the motion recognition system 16 or to better ensure that the industrial automation devices 20 are being operated safely, the motion recognition system 16 may use secondary inputs to supplement, complement, or even replace motion-based and/or position-based inputs recognized by the motion recognition system 16. For example, FIG. 9 depicts a method 140 for controlling one or more industrial automation devices 20 within the industrial automation system 10 using the range camera system 12 and some secondary input.

The secondary input may include any input or signal received or generated by the system controller 18 or the motion recognition system 16 that may be used to complement or confirm the automation command. As such, the motion recognition system 16 may verify the validity of the interpreted automation command based on whether an expected secondary input has been received by the system controller 18 or the motion recognition system 16.

Figure 9:
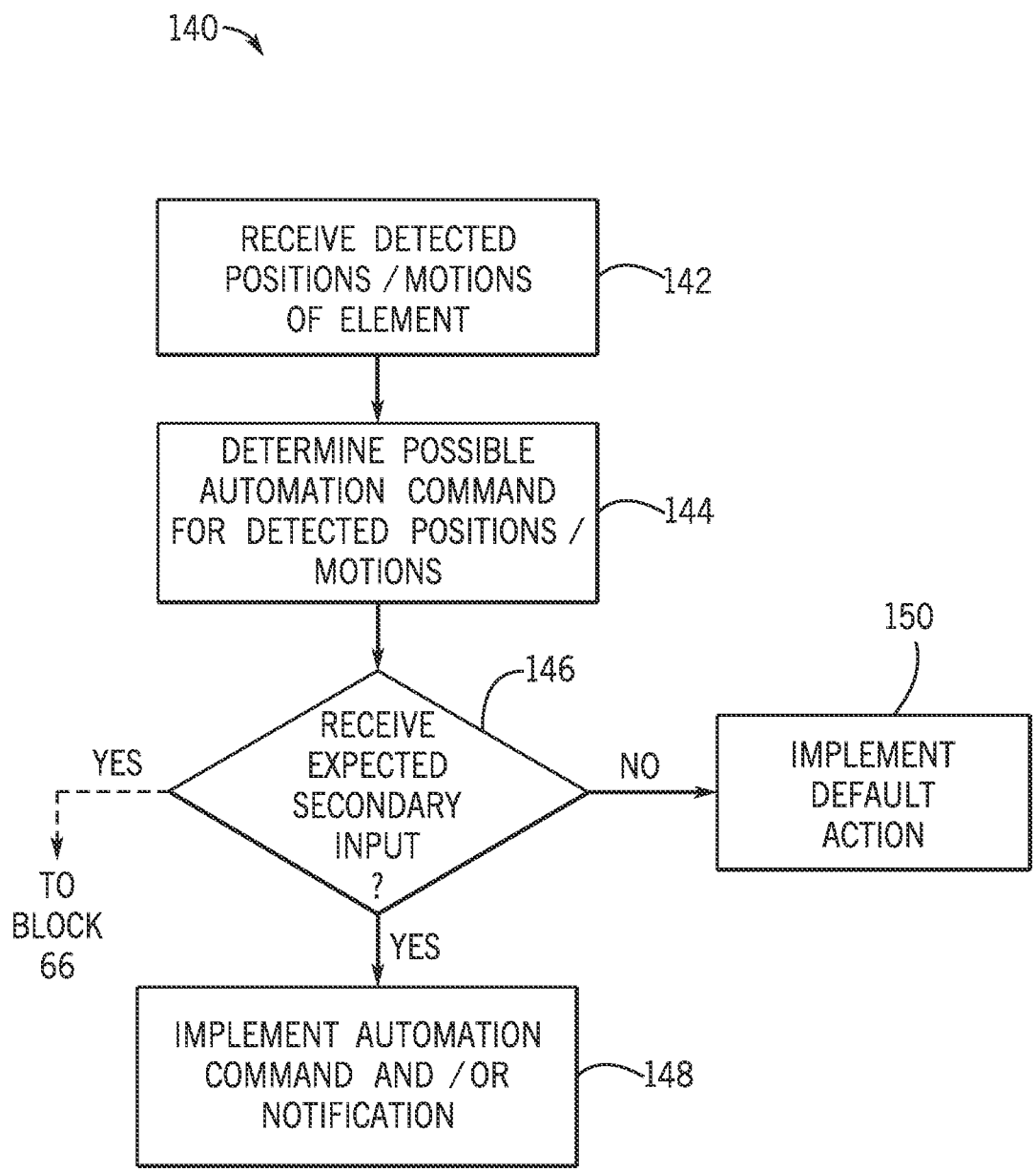
FIG. 9 is a flow chart of a method for controlling one or more devices within the industrial automation system using the range camera system of FIG. 1 and a secondary input, in accordance with an embodiment.

Keeping this in mind and referring to FIG. 9, at block 142, the motion recognition system 16 may receive detected positions and/or motions of the element, as described above with respect to block 62 of FIG. 4. In one embodiment, the detected positions and/or motions of the element received by the motion recognition system 16 may include metadata or information related to the confidence value 92 or 112 for the detected positions and/or motions received at block 142.

After receiving the detected positions and/or motions of the element, at block 144, the motion recognition system 16 may determine a possible automation command for the detected positions and/or motions received at block 142, as described above with respect to block 64 of FIG. 4. Although not shown in FIG. 9, it should be noted that in certain embodiments, the motion recognition system 16 may determine a confidence value for the automation command determined at block 144 based on the confidence value 92 or 112, the difference between the detected positions and/or motions received at block 142 and expected positions and/or motions that correspond to the possible automation command determined at block 144, and the like.

At block 146, the motion recognition system 16 may determine whether an expected secondary input or automation system signal has been received. As mentioned above, the secondary input may include an input or signal received by the motion recognition system 16 to verify that the automation command determined at block 144 corresponds to an automation command to be implemented. As such, the secondary input may include the use of manual or other control inputs such as a push button located within the industrial automation system 10, an input provided to the motion recognition system 16 via the input/output ports 50, an input received by the motion recognition system 16 via a sensor disposed on the industrial automation device 20 or within the industrial automation system 10, or the like.

For example, the secondary input may include a manual switch or button operated by the human 26. The secondary inputs may also include a weight detected on a safety/pressure mat, a signal from a light curtain indicating whether the light curtain has been broken, an indication from an area scanner, or inputs from enable pendants, safety gates, guard interlocks, emergency stop switches, or the like.

Another example of the secondary input may include voice commands or confirmations. As such, at block 144, the machine recognition system 16 may expect to receive a voice command from the human 26 that may correspond to an expected voice command for the respective determined automation command. For instance, the expected secondary input associated with a detected motion that may correspond to a stop automation command may include a speech by the human 26 that recites, "stop."

In one embodiment, the secondary input may be the detected positions of the element with respect to some automation device 20, while the automation command determined at block 144 may be based on the detected motions of the element. For example, if the motion recognition system 16 determines that the motions of the human 26 correspond to an automation command that engages a press machine, the motion recognition system 16 may, at block 146, determine whether the detected location of the human 26 is a safe distance away from the press machine or outside of an area in which a material may be pressed. As such, the location of the human 26 may be used as the expected secondary input at block 146. Moreover, in this manner, the motion recognition system 16 may coordinate motions detected by the range camera 14 with positions detected by the range camera 14 to control the operation of various devices within the industrial automation system 10. As such, the motion recognition system 16 may ensure that industrial automation devices 20 are operated safely and as per their respective specifications.

Referring back to block 146, if the motion recognition system 16 receives the expected secondary input, the motion recognition system 16 may proceed to block 148 and implement the automation command determined at block 144. In one embodiment, in addition to or in lieu of implementing the automation command, the motion recognition system 16 may send a notification message (e.g., e-mail, text message) to an administrator or operator of the industrial automation system 10 that indicates that the automation command has been implemented, that the automation command has been requested to be implemented, or the like.

If, however, at block 146, the motion recognition system 16 does not receive the expected secondary input, the motion recognition system 16 may proceed to block 150 and implement a default action. In one embodiment, a default action may be defined or determined for each automation device 20. The default action may defined or determined to correspond to a safe-sate (e.g., de-energized) for the respective industrial automation device 20. In other words, if the motion recognition system 16 does not receive the expected secondary input, the motion recognition system 16 may determine the safe-state for the respective industrial automation device 20 and implement the automation command that corresponds to the safe-state. For example, if the expected secondary input corresponds to a signal indicating that the human 26 is standing on a pressure mat and therefore located a safe distance away from the respective industrial automation device 20, the motion recognition system 16 may determine the safe-state automation command for the respective automation device 20 by assuming that the human 26 is not standing on the pressure mat. As such, the motion recognition system 16 may determine that the safe-state for the respective automation device 20 may include de-energizing the respective automation device 20, thereby ensuring that a person is not hurt or an object is not damaged by the respective automation device 20. In this case, the motion recognition system 16 may then send a command to the respective automation device 20 to operate in the safe-state mode. In certain embodiments, the default action or the safe-state mode may include performing no action at all. As such, the default action may include continuing the operation of the respective automation device 20.

In addition to or in lieu of implementing the default action, the motion recognition system 16 may send a notification to an administrator or operator of the industrial automation system 10 that indicates that the default action has been implemented, that the secondary input has not been received, or the like. In one embodiment, the notification may include suggestions or instructions as to what the motion recognition system 16 may be seeking as the secondary input.

In certain embodiments, after determining that the expected secondary input has been received, the motion recognition system 16 may proceed to block 66 of FIG. 4. As such, the motion recognition system 16 may determine the confidence value 92 or 112 for the detected positions and/or motions received at block 142. Alternatively or additionally, the motion recognition system 16 may determine a confidence value for the possible automation command determined at block 144, as described above with respect to block 66. The motion recognition system 16 may then follow the process of the method 60 to may better ensure that the automation command determined at block 144 may correctly match the detected positions and/or motions of the element received at block 142.

Automation Commands Based on Detected Positions/Motions Derivative Data

In addition to determining automation commands based on detected positions and/or motions of an element, the motion recognition system 16 may also analyze a derivative value of the detected positions and/or motions when determining automation commands. That is, the motion recognition system 16 may determine one or more derivative values of the detected positions for an element and determine an automation command based on the derivative values. The derivative values of data corresponding to the detected positions of the element may indicate a velocity in which the element is moving. In certain embodiments, the motion recognition system 16 may use the velocity information in determining an automation command for the detected positions. For instance, the velocity data may be used to quantify a speed in which the determined automation command should be implemented.

In the same manner, the derivative values of data corresponding to the detected motions of the element may indicate an acceleration or a change in acceleration that corresponds to how the element may be moving. The acceleration or change in acceleration data may be interpreted by the motion recognition system 16 to indicate a sense of urgency or an undesired event with respect to the detected motions of the element. For instance, if the human 26 moves with increasing speed towards an emergency stop switch, the motion recognition system 16 may interpret the high acceleration or high change in acceleration data that corresponds to the motion of the human 26 as indicating that a serious issue may be present in the industrial automation system 10. Moreover, the acceleration or change in acceleration data may also be used to predict a location of the human 26 (or other tracked object) at various points in time. Additional details with regard to using derivative-based data in determining automation commands for the industrial automation system 10 is provided below with reference to FIG. 10.

Figure 10:
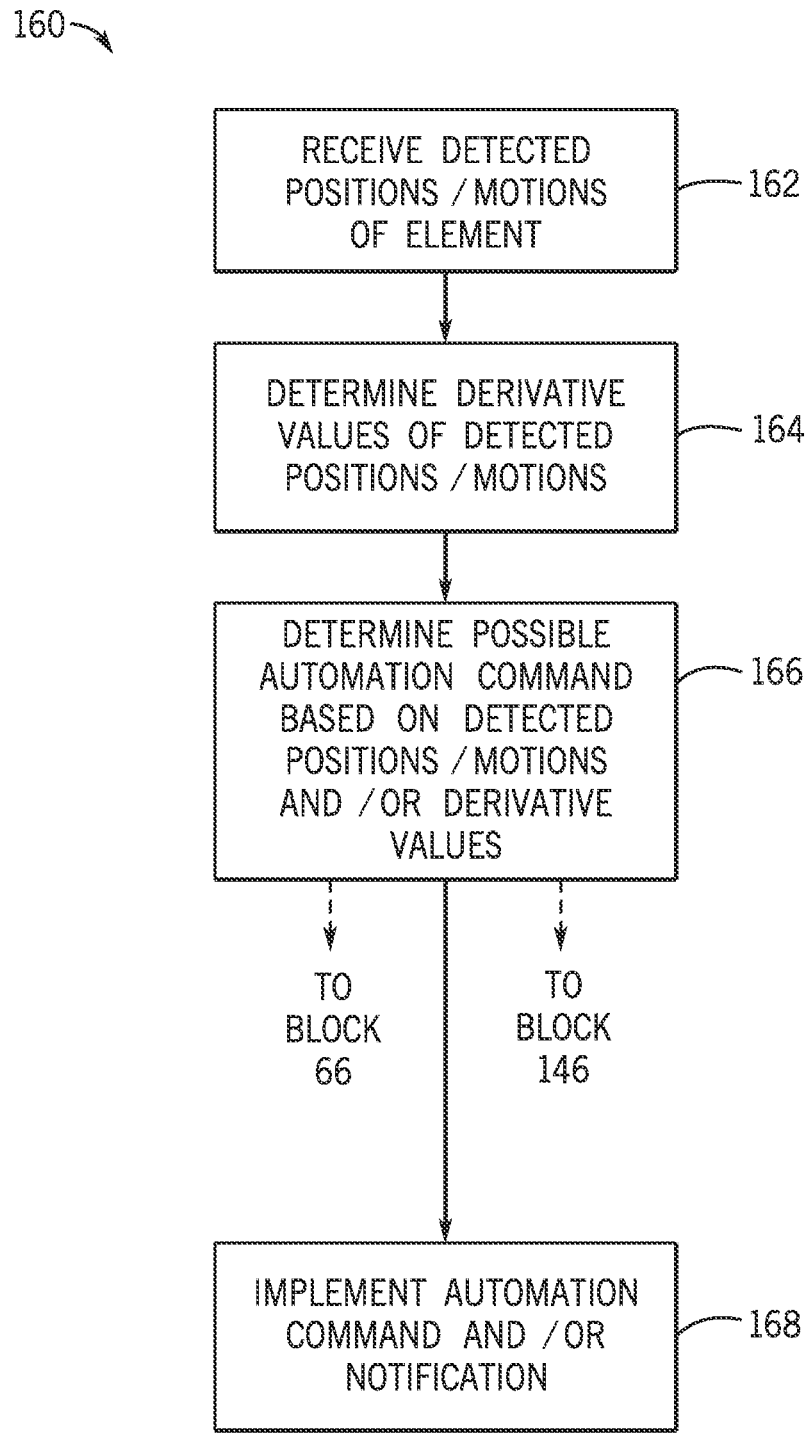
FIG. 10 is a flow chart of a method for controlling one or more devices within the industrial automation system using derivative values of positions and/or motions detected by the range camera system of FIG. 1, in accordance with an embodiment.

Referring now to FIG. 10, the motion recognition system 16 may employ a method 160 to implement automation commands and/or notifications based on derivative data related to positions and/or motions detected by the range camera 14. At block 162, the motion recognition system 16 may receive detected positions and/or motions of an element, as described above with reference to block 62 of FIG. 4.

After receiving the detected positions and/or motions of the element, at block 164, the motion recognition system 16 may determine derivative values for the detected positions and/or motions received at block 162. In one embodiment, for detected position data, the motion recognition system 16 may generate a position function that represents the positions of the data points 82 or 102 over time. The motion recognition system 16 may then determine a derivative value for the generated position function to determine a rate of change in the detected positions of the data points 82 or 102, which may correspond to a velocity in which the data points 82 or 102 move.

In another embodiment, for detected motion data, the motion recognition system 16 may generate a motion function that represents the motions of the data points 82 or 102 over time. The motion recognition system 16 may then determine a derivative value for the generated motion function to determine a rate of change in the detected motions of the data points 82 or 102, which may correspond to an acceleration of the detected motion for the data points 82 or 102.

At block 166, the motion recognition system 16 may determine possible automation commands based on the detected positions and/or motions received at block 162 and/or the derivative values of the detected positions and/or motions determined at block 164. That is, the motion recognition engine 124 may determine an automation command that corresponds to the detected positions and/or motions from the library 122, as described above with reference to block 64 of FIG. 4, and may refine or revise the determined automation command based on the derivative values of the detected positions and/or motions determined at block 164.

For example, in addition to the data related to positions and/or motions of an element, the library 122 may also include expected velocities and accelerations that correspond to the data related to the positions and/or motions of the element. In other words, in addition to associating certain positions and/or motions of an element with a particular automation command, the library 122 may also associate the certain positions and/or motions of the element of the particular automation command with expected velocities and/or acceleration values that correspond to how the element moves. In this manner, the motion recognition system 16 may detect a sense of urgency in the automation command or may flag any unusual behavior of the element that invoked the automation command.

Keeping this in mind, at block 166, the motion recognition system 16 may first retrieve an automation command from the library 122 based on the detected positions and/or motions of the element. However, the motion recognition 16 may then revise or alter the retrieved automation command based on the derivative values of the detected positions and/or motions. By way of example, after determining that the positions and/or motions of an element correspond to an automation command that increases the speed of a motor, the motion recognition system 16 may then consult the library 122 to determine whether the derivative values of the detected positions and/or motions of the element are within expected ranges of the derivative values of the detected positions and/or motions for the element.

If the derivative values of the detected positions and/or motions of the element are not within the expected ranges of the derivative values, the motion recognition system 16 may alter or modify the automation command retrieved from the library 122. For instance, referring back to the example above, if the automation command corresponds to increasing the speed of a motor, the motion recognition system 16 may change the automation command to disable the motor. In this example, the motion recognition system 16 may disable the industrial automation device 20 (i.e., motor) to ensure that the industrial automation device 20 is operated safely and to ensure that the appropriate element's positions and/or motions were detected. That is, by recognizing whether the derivative values relatively matched expected the expected derivative values, the motion recognition system 16 may provide additional security in preventing unauthorized personnel from operating devices in the industrial automation system 10.

In certain embodiments, the library 122 may generally include data related to expected velocity and acceleration values for motions that correspond to each of the automation commands stored therein. In addition to expected velocity and acceleration values for automation commands, the library 122 may also store expected velocity and acceleration values that correspond to the general behavior of an element such as the human 26, the machine 28, or the material 30. As such, the expected velocity and acceleration values may include a range of velocity and acceleration values that correspond to normal behavioral movements of the human 26, the machine 28, or the material 30. In certain embodiments, the motion recognition system 16 may determine the expected velocity and acceleration values for any element based on historical data acquired by the range camera 14. That is, the motion recognition system 16 may detect the positions and/or motions of various elements over time and identify positions and/or motions of the elements that may correspond to normal behavior. The motion recognition system 16 may then determine the derivative values for the positions and/or motions of the elements that correspond to the normal behavior and identify a range of derivative values (e.g., velocity and acceleration data) correspond to the normal behavior.

Keeping this in mind, the motion recognition system 16 may, at block 166, determine an automation command based on whether the detected positions and/or motions have derivative values that correspond to the expected derivative values. That is, the motion recognition system 16 may interpret whether the detected motions of the element correspond to normal movements or abnormal movements and determine an automation command based on whether the element's movements are normal or abnormal. For instance, if the human 26 suddenly falls to the floor or becomes immobile, the motion of the human 26 falling to the floor or remaining immobile may have derivative values that are outside a range of expected derivative values for a human. As such, the motion recognition system 16 may recognize or detect these types of undesirable situations based on the velocity or acceleration data related to the motion of the human 26. In another example, the motion recognition system 16 may determine that the machine 28 or the material 30 may be moving at a velocity or acceleration that may fall outside of the expected range of derivative values. In this case, the motion recognition system 16 may determine that the machine 28 or the material 30 may be moving abnormally, which may result in damage to the machine 28, the material 30, or the like.

If the motion recognition system 16 determines the derivative values that are outside a range of expected derivative values, the motion recognition system 16 may then determine one or more automation commands for various industrial automation devices 20 that may be designed to keep the human 26 safe, the industrial automation system 10 functioning, or the like. For instance, the motion recognition system 16 may predict the movements and operations of the industrial automation devices 20 that may be within a proximity of the human 26 or that may risk further injuring the human 26 and determine automation commands that may minimize any risk of further injury to the human 26. For example, the determined automation command(s) may include stopping the operation of various industrial automation devices 20, machines 28, or the like.

In certain embodiments, the motion recognition system 16 may, at block 166, determine possible automation commands based on the derivative values by predicting whether the human 26, the machine 28, the material 30, or the automation device 20 may physically contact each other or enter within each other's operating space. That is, using the derivative values of the detected motions received at block 162, the motion recognition system 16 may predict whether two elements are moving in a pattern that may result in an injury or damage to either element. Moreover, by using the detected positions and/or motions of the element and the derivative values of the detected positions and/or motions, the motion recognition system 16 may predict when the elements may collide, cause injury, cause damage, or the like. As such, the motion recognition system 16 may determine one or more automation commands that may prevent injury or damage to any element within the industrial automation system 10. For instance, if the motion recognition system 16 predicts that two elements may collide with each other based on the detected positions and/or motions of the elements and the derivative values of the detected positions and/or motions, the motion recognition system 16 may determine automation commands for various industrial automation devices 20 and/or machines 28 that may cause the industrial automation devices 20 and/or machines 28 to move in an opposite direction than its current direction to avoid the collision.

In some embodiments, the motion recognition system 16 may quantify the determined automation command based on the derivative values of the detected positions and/or motions. In other words, the motion recognition 124 may attribute some numerical value to an aspect that relates to the determined automation command. For example, if the motion recognition engine 124 retrieves an automation command from the library 122 that corresponds to stopping the operation of an industrial automation device 20, the motion recognition system 16 may use the derivative value of the detected positions and/or motions to quantify a sense of urgency or importance related to the automation command to stop the industrial automation device 20. That is, if the derivative values indicate that the velocity and/or acceleration are greater than an expected range of velocity and/or acceleration, the motion recognition system 16 may determine that the corresponding automation command has a high degree of urgency or importance. As such, at block 166, the motion recognition system 16 may determine additional automation commands based on the heightened sense of importance. Referring back to the example above, after retrieving an automation command from the library 122 that corresponds to stopping the operation of an industrial automation device 20, the motion recognition system 16 may generate additional automation commands to stop other related industrial automation devices 20 to protect the entire industrial automation system 10 if the retrieved automation command is interpreted to have a high importance.

After determining the possible automation command based on the detected positions and/or motions and/or based on the derivative values, the motion recognition system 16 may implement the automation command(s) determined at block 166. In some cases, the motion recognition system 16 may send a notification to an administrator or operator of the industrial automation system 10 that indicates the determined automation command(s). If the motion recognition system 16 detected an abnormal or undesirable event, as described above, the motion recognition system 16 may send a notification to the administrator or operator of the industrial automation system 10 that provides details related to the abnormal or undesirable event.

Referring back to block 166, in certain embodiments, after determining the possible automation command(s), the motion recognition system 16 may proceed to block 66 of FIG. 4. As such, the motion recognition system 16 may determine the confidence value 92 or 112 for the detected positions and/or motions received at block 162. Alternatively or additionally, the motion recognition system 16 may determine a confidence value for the possible automation command determined at block 166, as described above with respect to block 66. In this manner, the motion recognition system 16 may better ensure that the automation command determined at block 166 may correctly match the detected positions and/or motions of the element received at block 162.

In another embodiment, after determining the possible automation command(s) at block 166, the motion recognition system 16 may proceed to block 146 of FIG. 9. As such, the motion recognition system 16 may determine whether an expected secondary input has been received, as described above with reference to block 146 of FIG. 9. The motion recognition system 16 may then verify the validity of the determined automation command based on whether an expected secondary input has been received by the system controller 18 or the motion recognition system 16.

Referring again to block 166, the motion recognition system 16 may determine possible automation commands based on historical data that may be stored in a memory. That is, the motion recognition system 16 may learn to associate particular patterns of motion with a respective automation command using the historical data. For instance, if the motion recognition system 16 determines that a particular pattern of motion is typically associated with a particular automation command according to the historical data, the motion recognition system 16 may learn or associate the particular pattern of motion with the particular automation command.

Figure 11:
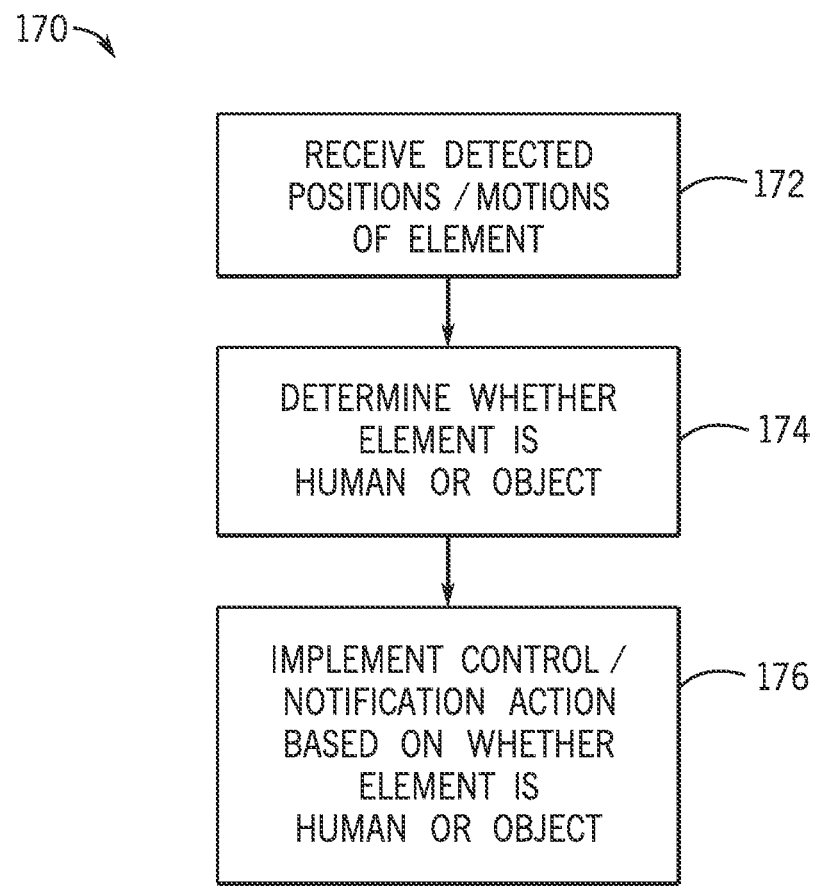
FIG. 11 is a flow chart of a method for controlling one or more devices within the industrial automation system based on whether humans or objects are present in the industrial automation system as detected by the range camera system of FIG. 1, in accordance with an embodiment.

Automation Commands Based on Detected Positions/Motions and Type of Element Present In addition to interpreting positions and/or motions of an element in the industrial automation system as described above in FIG. 4, FIG. 9, and FIG. 10, the motion recognition system 16 may also distinguish between humans and objects in the industrial automation environment 24 and implement various controls and/or notification actions based on whether the element is human or not (FIG. 11). For example, the motion recognition system 16 may control how lights and air conditioning within the industrial automation environment 24 may function based on whether a human or an object is moving in the industrial automation environment 24.

Keeping this in mind, FIG. 11 depicts a method 170 for implementing various control and/or notification actions related to the industrial automation system 10 based on whether a human or an object (i.e., non-human) is present in the industrial automation environment. Referring now to FIG. 11, at block 172, the motion recognition system 16 may receive detected positions and/or motions of an element present in the industrial automation environment 24 from the range camera 14, as described above.

At block 174, the motion recognition system 16 may determine whether the element corresponds to a human (e.g., the human 26) or an object (e.g., the machine 26 or the material 30) based on the detected positions and/or motions received at block 172. In certain embodiments, the motion recognition system 16 may compare the positions of the data points 82 or 102 with templates or known data point arrangements of humans. If the positions of the data points 82 or 102 correspond to the template or known data point arrangements of humans, the motion recognition system 16 may determine that the element is a human. Otherwise, the motion recognition system 16 may classify the element as an object or non-human.

In another embodiment, the motion recognition system 16 may compare the motions of the element received at block 172 with templates or known motion patterns of humans. If the received motions correspond to the template or known motion patterns of humans, the motion recognition system 16 may determine that the element is a human. Otherwise, the motion recognition system 16 may classify the element as an object or non-human.

Once the motion recognition system 16 determines that the element is either a human or an object, the motion recognition system 16 may implement a control action and/or a notification action based on whether the element is determined to be a human or an object. The control action may include operating any device in the industrial automation system 10 or controlling various environmental parameters in the industrial automation environment 24. For instance, FIG. 12 illustrates an example environment control system 180 that may use the motion recognition system 16 to control the various environmental parameters in the industrial automation environment 24, as described above with reference to the method 170.

Referring now to FIG. 12, the environment control system 180 may include various environment control features such as a heating, ventilation, and air conditioning (HVAC) unit 182, a light control unit 184, or the like. The HVAC unit 182 may control the airflow, maintain the air quality, or regulate the temperature in the industrial automation environment 24 by providing ventilation, air filtration, and the like. The light control unit 184 may control the operations of lights 186 used to illuminate the industrial automation environment. In certain embodiments, the HVAC unit 182 and the light control unit 184 may be coupled to the system controller 18 as shown in FIG. 12. As such, the system controller 18 may provide signals to the HVAC unit 182 and the light control unit 184 to control the environment within the industrial automation environment 24. However, it should be noted that in some embodiments, the motion recognition system 16 may be directly coupled to the environment control devices, as opposed to via the system controller 18.

Keeping the environment control system 180 in mind and referring back to block 176, the motion recognition system 16 may control the operations of the HVAC unit 182, the light control unit 184, or the like based on whether the detected element is a human or an object. For instance, the conditions within the industrial automation environment 24 should not cater to humans when humans are not present therein. As such, in one embodiment, if the motion recognition system 16 determines that the element present in the industrial automation environment 24 is not a human, the motion recognition system 16 may send one or more signals to the system controller 18 to modify the operations of the HVAC unit 182, the light control unit 184, and the like. By way of example, the motion recognition system 16 may send signals to the system controller 18 to stop operating the HVAC unit 182 or turn the lights 186 off when the motion recognition system 16 determines that no human is present in the industrial automation environment 24. In this manner, the industrial automation devices 20, the machines 28, and the material 30 may continue to move throughout the industrial automation environment 24 while operating in a human-unsuitable (e.g., uncomfortable) condition or low-light condition. That is, since the industrial automation devices 20, the machines 28, and the material 30 may not be affected by operating in a human-suitable or human-unsuitable environment, the motion recognition system 16 may operate the environment control devices more efficiently by minimizing the use of the HVAC unit 182 or the light control unit 184. Moreover, once the received detected positions and/or motions of the element are determined to be human, the motion recognition system 16 may, at block 176, adjust the operations of the environment control devices to make the industrial automation environment 24 more suitable or comfortable for humans.

Besides controlling the environment control devices in the industrial automation system, the motion recognition system 16 may also control the industrial automation devices 20 or the machines 28 based on whether the element is human or not. For instance, in certain embodiments, the motion recognition system 16 may be arranged such that the range camera 14 may monitor an area within the industrial automation environment 24, which may be designated as a hazardous area or an area where humans should not enter. As such, if, at block 174, the motion recognition system 16 determines that the element in the area corresponds to a human, the motion recognition system 16 may send one or more signals to the system controller 18 to alter or stop the operation of the industrial automation devices 20, the machines 28, or the like to protect the human now present in the area. In this manner, the motion recognition system 16 may allow a wide variety of objects of various sizes and orientations to pass into a hazardous area, while maintaining a safe environment in the industrial automation environment 24 when a human is present.

The notification actions may include sending a notification message (e.g., e-mail, text message) to an administrator or operator of the industrial automation system 10 that indicates that the automation command has been implemented, that the control action of block 176 has been implemented. In one embodiment, the notification message may also include an indication that a human is present in the industrial automation environment 24 when it is not authorized to be present and the like.

In addition to implementing control actions and/or notification actions based on whether the detected positions and/or motions are made by humans or non-humans, the motion recognition system 16 may also implement control actions and/or notification actions based distinctions detected between humans present in the industrial automation environment 24. For instance, FIG. 13 depicts an example of a method 190 for implementing automation commands and/or notification actions based on distinctions detected between humans in the industrial automation environment.

Referring now to FIG. 13, at block 192, the motion recognition system 16 may scan the industrial automation environment 24 using the range camera 14. At block 194, the motion recognition system 16 may identify humans operating or present in the industrial automation environment 24. The motion recognition system 16 may then determine which of the present humans are authorized to implement automation commands using the motion recognition system 16.

In one embodiment, the human 26 may perform a particular motion or gesture to designate himself as an authorized person in the industrial automation environment 24. As such, the human 26 may use a gesture-based sign in motion or authentication process to designate himself as an authorized person.

In another embodiment, the motion recognition system 16 may search for individuals wearing a particular article of clothing such as a vest, a button, a belt, gloves, or the like. The particular article of clothing may designate the individual as the authorized human for implementing automation commands. In some instances, humans carrying or wearing an undesirable object such as a gun or laptop may be designated as unauthorized personnel. In these instances, the motion recognition system 16 may send a notification or alarm to indicate the presence of unauthorized personnel in the industrial automation environment 24.

In yet another embodiment, the motion recognition system 16 may search for an emblem or symbol disposed on the human 26 such as a badge to designate the human 26 as the authorized human. In some instance, the motion recognition system 16 may work in conjunction with the sensors 22 to detect a radio frequency identification (RFID) tag or the like disposed on the human 26 to designate the human 26 as the authorized human.

The motion recognition system 16 may also store profiles of authorized individuals in its memory. For instance, the profiles may include data related to facial features, body parameters, or the like associated with authorized humans. As such, the motion recognition system 16 may, at block 194, identify authorized personnel based on whether their facial features, body parameters, or the like match that of the facial features, body parameter, or the like stored in the profiles.

The motion recognition system 16 may also recognize an authorized human be receiving a gesture or motion from a known authorized human indicating that another human is also authorized. That is, a known authorized human may transfer his authorization status to another human or designate another human in the industrial automation environment 24 as authorized using particular motions, gestures, or the like.

The motion recognition system 16 may also identify authorized humans by detecting specific color or clothing attributes on humans. In one embodiment, different colors or clothing attributes disposed on a human may indicate different levels of authority. That is, different levels of authority may be associated with different humans in the industrial automation environment 24. Each different level of authority may enable the respective human to implement a different set of automation commands. Although the different levels of authority has been described as being associated on humans based on detecting specific colors or clothing attributes, it should be noted that the motion recognition system 16 may designate different humans as having different levels of authority based on particular motions or gestures performed by a human, particular articles of clothing worn by the human, certain emblems, symbols, or tags being detected on the human, stored profiles of the human, as described above.

After the motion recognition system 16 identifies the authorized personnel at block 194, the motion recognition system 16 may, at block 196, receive detected positions and/or motions that correspond to the identified authorized personnel from the range camera 14. In certain embodiments, the motion recognition system 16 may proceed to block 66 of FIG. 4. As such, the motion recognition system 16 may then proceed to block 64 and follow the process of the method 60 to implement automation commands using confidence values.

After receiving the detected positions and/or motions of the authorized human at block 196, the motion recognition system 16 may proceed to block 144 of FIG. 9 and follow the process of the method 140. As such, the motion recognition system 16 may determine whether an expected secondary input has been received, as described above with reference to block 146 of FIG. 9. As such, the motion recognition system 16 may verify the validity of the determined automation command of the authorized human based on whether an expected secondary input has been received by the system controller 18 or the motion recognition system 16.

In one embodiment, after receiving the detected positions and/or motions of the authorized human at block 196, the motion recognition system 16 may proceed to block 164 of FIG. 10 and follow the process of the method 160. As such, the motion recognition system 16 may determine the automation command that corresponds to the detected positions and/or motions based on derivative values for the detected positions and/or motions, as described above with reference to block 166 of FIG. 10. As such, the motion recognition system 16 may further interpret the detected positions and/or motions of the human 26 using the derivative values.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for performing industrial automation control, comprising:
    receiving, via a sensor system, image data representing one or more humans and one or more objects in an industrial automation system;
    converting the image data into two-dimensional representations of the humans and the objects, wherein each of the two-dimensional representations comprise a plurality of data points located at edges of a respective two-dimensional representation;
    distinguishing between the one or more humans and the one or more objects based upon the plurality of data points for each respective two-dimensional representation and a plurality of templates, wherein each of the plurality of templates comprise a known arrangement of data points;
    designating one of the one or more humans as an authorized operator based on an article carried or worn by the one of the one or more humans, wherein the authorized operator is authorized to implement one or more control actions to control one or more operations of one or more machines in the industrial automation system; and
    implementing the one or more control actions based upon one or more motions of the authorized operator.

2. The method of claim 1, wherein the one of the one or more humans is distinguished from other humans who is not the authorized operator.

3. The method of claim 1, wherein the article comprises an article of clothing.

4. The method of claim 1, wherein the one of the one or more humans is distinguished from one of the objects.

5. The method of claim 4, wherein the control actions comprise adjusting an environmental system based upon whether movement of the one of the one or more humans or the one of the objects is detected.

6. The method of claim 5, wherein the environmental system comprises a lighting unit or an air conditioning unit, and wherein the lighting unit or the air conditioning unit is configured to operate in a human-suitable condition if the movement of the one of the humans is detected.

7. The method of claim 5, wherein the environmental system comprises a lighting unit or an air conditioning unit, and wherein the lighting unit or the air conditioning unit is placed in a human-unsuitable condition if the movement of the one of the objects is detected and no human is detected.

8. The method of claim 1, comprising:
    detecting, via the sensor system, an undesirable object in the industrial automation system; and
    implementing the one or more control actions based upon the detecting of the undesired object.

9. A system for performing industrial automation control, comprising:
    a sensor system configured to receive image data depicting an element in an industrial system;
    a processing component configured to:
        convert the image data into a two-dimensional representation of the element, wherein the two-dimensional representation comprises a plurality of data points located at edges of the two-dimensional representation;
        identify one or more humans based on the plurality of data points and a plurality of templates, wherein each of the plurality of templates comprises a known arrangement of data points;
        receive one or more signals from one or more emitters disposed on one of the one or more humans;
        designate the one of the one or more humans as an authorized operator based on the signals, wherein the authorized operator is authorized to implement one or more control actions to control one or more operations of one or more machines in the industrial system; and send a command to the one or more machines based on one or more actions by the authorized operator.

10. The system of claim 9, comprising determining whether the element corresponds to the one or more humans or one or more objects by comparing positions of the data points with a known pattern of positions associated with a human.

11. The system of claim 9, comprising determining whether the element corresponds to the one or more humans or one or more objects by comparing motions of the data points with a known pattern of motion associated with a human.

12. The system of claim 9, wherein the processing component is configured to send the command to an environment control device to control an airflow, maintain an air quality, or regulate a temperature in the industrial system when the one or more humans are identified.

13. The system of claim 12, wherein the environment control device is a heating, ventilation, and air conditioning (HVAC) unit.

14. The system of claim 13, wherein the command to the HVAC unit is configured to set a condition in the industrial system to a human-unsuitable condition when the one or more humans are not identified.

15. The system of claim 12, wherein the processing component is configured to send the command to the environment control device to turn on one or more lights in the industrial system when the one or more humans are identified.

16. The system of claim 9, wherein the processing component is configured to send an automation command to stop an industrial automation device when the one or more humans are determined to be present in an area associated with the industrial system.

17. A method for performing industrial automation control, comprising:

receiving, via a sensor system, image data depicting one or more humans in an industrial automation system;

converting the image data into one or more two-dimensional representations of the one or more humans, wherein each of the one or more two-dimensional representations comprises a plurality of data points located at edges thereof;

detecting, via the sensor system, motions of the one or more humans in the industrial automation system based on the plurality of data points and a plurality of templates, wherein each of the plurality of templates comprises a known arrangement of data points;

determining whether the one or more humans are associated with an authorized status based upon the detected motions, wherein the detected motions comprise a gesture-based sign in motion; and implementing a control or notification action based upon whether the one or more humans are associated with the authorized status, wherein the one or more humans associated with the authorized status are authorized to implement the control or notification action.

18. The method of claim 17, comprising:

detecting, via the sensor system, an article of clothing is disposed on the one or more humans; and confirming that the one or more humans are associated with the authorized status when the article of clothing is disposed on the one or more humans.

19. The method of claim 17, wherein determining that the one or more humans are associated with the authorized status comprises:

detecting, via the sensor system, one or more facial features and/or body parameters of the one or more humans;

comparing the detected facial features and/or body parameters to one or more profiles of a human; and confirming that the one or more humans are associated with the authorized status based on the comparison.

20. The method of claim 17, wherein determining that the one or more humans are associated with the authorized status comprises:

detecting, via the sensor system, one or more colors disposed on the one or more humans; and confirming that the one or more humans are associated with the authorized status when the colors are associated with the authorized status.

21. The method of claim 17, wherein determining that the one or more humans are associated with the authorized status comprises receiving one or more signals from one or more emitters disposed on the one or more humans, wherein the one or more signals are associated with the authorized status.

22. The method of claim 21, wherein the one or more emitters comprise radio frequency identification (RFID) sensors.

23. The method of claim 8, wherein the undesired object comprises a gun or a laptop.

* * * * *